US008393948B2

(12) United States Patent
Allen et al.

(10) Patent No.: US 8,393,948 B2
(45) Date of Patent: Mar. 12, 2013

(54) INTEGRATING SOCIAL COMMUNITIES AND WAGERING GAMES

(75) Inventors: Jeffrey L. Allen, Naperville, IL (US); Brian J. Barclay, Atlanta, GA (US); Mark B. Gagner, West Chicago, IL (US); Andrew C. Guinn, Chicago, IL (US)

(73) Assignee: WMS Gaming, Inc., Waukegan, IL (US)

( * ) Notice: Subject to any disclaimer, the term of this patent is extended or adjusted under 35 U.S.C. 154(b) by 0 days.

(21) Appl. No.: 13/386,234

(22) PCT Filed: Jul. 20, 2010

(86) PCT No.: PCT/US2010/042669
§ 371 (c)(1),
(2), (4) Date: Jan. 20, 2012

(87) PCT Pub. No.: WO2011/011466
PCT Pub. Date: Jan. 27, 2011

(65) Prior Publication Data
US 2012/0202587 A1  Aug. 9, 2012

Related U.S. Application Data

(60) Provisional application No. 61/227,152, filed on Jul. 21, 2009.

(51) Int. Cl.
*A63F 9/24* (2006.01)
(52) U.S. Cl. .................. 463/16; 463/25; 463/29; 463/42
(58) Field of Classification Search .................... 463/16, 463/25, 29, 42
See application file for complete search history.

(56) References Cited

U.S. PATENT DOCUMENTS

| | | | |
|---|---|---|---|
| 2002/0147049 A1* | 10/2002 | Carter, Sr. ........................ | 463/42 |
| 2006/0121971 A1 | 6/2006 | Slomiany et al. | |
| 2006/0287099 A1 | 12/2006 | Shaw et al. | |
| 2007/0072678 A1 | 3/2007 | Dagres | |
| 2007/0218997 A1 | 9/2007 | Cho | |
| 2008/0020814 A1 | 1/2008 | Kernene | |
| 2009/0117969 A1 | 5/2009 | Englman | |
| 2009/0170608 A1* | 7/2009 | Herrmann et al. .............. | 463/42 |

FOREIGN PATENT DOCUMENTS

| | | |
|---|---|---|
| GB | 2485506 | 5/2012 |
| WO | WO2011011466 | 1/2011 |

OTHER PUBLICATIONS

"PCT Application No. PCT/US10/42669 International Preliminary Report on Patentability", Oct. 17, 2011, 4 pages.
"PCT Application No. PCT/US10/42669 International Search Report", Sep. 15, 2010, 12 pages.

* cited by examiner

*Primary Examiner* — Omkar Deodhar
(74) *Attorney, Agent, or Firm* — DeLizio Gilliam, PLLC

(57) ABSTRACT

A wagering game system and its operations are described herein. In embodiments, the operations can include determining that an online communal wagering game (communal game) requests additional players. The online communal wagering game can be provided by a wagering game provider. The operations can further include determining one or more social network user accounts (social network accounts) available to play in the online communal wagering game. The social network accounts can from different social network websites, servers, etc., across the Internet, or other communications networks. The operations can further include aggregating the one or more social network accounts into a communal wagering game session, controlling the communal game with bets from the aggregated social network accounts, and providing social communication content that the social network accounts can use to communicate, receive notifications, view game replays, trade items, etc. The operations can also include using jurisdictional rules to control wagering functionality.

25 Claims, 11 Drawing Sheets

INTEGRATING SOCIAL COMMUNITIES AND WAGERING GAMES

RELATED APPLICATIONS

This application claims the priority benefit of U.S. Provisional Application Ser. No. 61/227,152 filed Jul. 21, 2009.

LIMITED COPYRIGHT WAIVER

A portion of the disclosure of this patent document contains material, which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2010, WMS Gaming, Inc.

TECHNICAL FIELD

Embodiments of the inventive subject matter relate generally to wagering game systems and networks that, more particularly, integrate social communities and wagering games.

BACKGROUND

Wagering game machines, such as slot machines, video poker machines and the like, have been a cornerstone of the gaming industry for several years. Traditionally, wagering game machines have been confined to physical buildings, like casinos (e.g., resort casinos, roadside casinos, etc.). The casinos are located in specific geographic locations that are authorized to present wagering games to casino patrons. However, with the proliferation of interest and use of the Internet, shrewd wagering game manufacturers have recognized that a global public network, such as the Internet, can reach to various locations of the world that have been authorized to present wagering games. Any individual with a personal computing device (e.g., a personal computer, a laptop, a personal digital assistant, a cell phone, etc.) can connect to the Internet and play wagering games. Consequently, some wagering game manufacturers have created wagering games that can be processed by personal computing devices and offered via online casino websites ("online casinos"). However, online casinos face challenges and struggles. For instance, online casinos have struggled to provide the excitement and entertainment that a real-world casino environment provides. Some online casinos have struggled enforcing cross jurisdictional restrictions and requirements. Further, some online casinos have struggled adapting the online gaming industry to a traditionally non-wagering game business environment. As a result, wagering game manufacturers, casino operators, and online game providers are constantly in need of innovative concepts that can make the online gaming industry appealing and profitable.

SUMMARY

In some embodiments, a method comprises determining an online communal wagering game provided by a wagering game provider; determining a request to add a player to the online communal wagering game; determining a social network user account available to play in the online communal wagering game, wherein the social network user account is provided by a social network provider; providing online communal wagering game data to the social network provider; receiving connection data for the social network user account; connecting the social network user account to an online communal gaming session using the connection data; determining a geographic location for the social network user account; determining jurisdictional rules for conducting wagering games for the geographic location; and controlling wagering functions for the social network user account in the online communal wagering game based on the jurisdictional rules.

In some embodiments, determining the request to add a player to the online communal wagering game comprises: determining a minimum number of players for the online communal wagering game, determining that a number of player accounts connected to the online communal wagering game is less than the minimum number of players, searching the social network provider to find the social network user account, and determining that the social network user account indicates a desire to join the online communal wagering game.

In some embodiments, the connection data includes account connection information to connect the social network user account to an associated wagering game player account.

In some embodiments, the method further comprises: receiving social network communication data from the social network user account directed to an additional social network user account connected to the online communal wagering game; and presenting the social network communication data in a wagering game interface on a social network website.

In some embodiments, controlling wagering functions for the social network user account further comprises determining a type of pay-in allowable for the jurisdiction; and providing a pay-out of the same type.

In some embodiments, the method further comprises providing affiliate compensation to the social network provider for providing the social network user account.

In some embodiments, one or more machine-readable media having instructions stored thereon, which when executed by a set of one or more processors causes the set of one or more processors to perform operations comprising: determining an online social communication session, wherein the online social communication session is connected to a communal wagering game controlled by a wagering game server; determining a first social network user account connected to a social network; determining a second social network user account; determining a request by the first social network user account to communicate with the second social network user account via one or more online social communication controls provided in connection with the online social communication session; connecting the second social network user account to the online social communication session; receiving social network communication data from the first social network user account directed to the second social network user accounts; presenting the social network communication data to the second social network user account; and controlling wagering functions for the first social network user account in the communal wagering game based on jurisdictional rules for a geographic location of the first social network user account.

In some embodiments, the one or more machine readable media the operations further comprises presenting a communal wagering game interface to the first social network user account on a social network website; and presenting the one or more online social communication controls on the communal wagering game interface.

In some embodiments, the one or more machine-readable media said operations further comprises: determining a request to add the first social network user account to the communal wagering game; connecting the first social network user account to the communal wagering game; and transacting wagering activity for the first social network user account.

In some embodiments, the operation of controlling wagering functions for the first social network user account includes operations further comprising: determining that the social network communication data includes a cash side-wager challenge by first social network user account; determining that the jurisdictional rules do not allow cash side wagers for the second social network user account; and presenting options for the second social network user account to alter the side-bet challenge to comport with jurisdictional rules.

In some embodiments, the one or more machine-readable media said operations further comprises: determining one or more preference settings for the first social network user account regarding one or more characteristics of players within the communal wagering game, wherein the one or more characteristics include a commonality a social group; and connecting the first social network user account to a group of players of the communal wagering game that correspond to the one or more characteristics.

In some embodiments, the one or more machine-readable media said operations further comprises: filtering a chat session based on the one or more preference settings.

In some embodiments, the first social network user account and the second social network user account belong to different social network providers.

In some embodiments, a system comprises: a social network server configured to receive a request to add one or more players to an online communal wagering game hosted by a wagering game provider; determine that one or more social network accounts hosted by the social network server are available to play in the online communal wagering game; provide connection data to the wagering game provider to connect the one or more social network user accounts to an online communal gaming session; receive syndicated communal wagering game content from the wagering game provider, and provide an online communal wagering game interface, from the syndicated communal wagering game content; and a client comprises a social network gaming module configured to present the online communal wagering game interface; determine communal wagering game playing activity for the one or more social network user accounts via the online communal wagering game interface; and provide the communal wagering game playing activity to the wagering game provider to transact the online communal wagering game.

In some embodiments, the system further comprises: a wagering game server including a player aggregator configured to receive the connection data, connect the one or more social network user accounts to the online communal gaming session, and to provide the syndicated communal wagering game content. The player aggregator can further comprise and a communal game controller configured to receive the communal wagering game playing activity, and to transact the online communal wagering game.

In some embodiments, the wagering game server is further configured to license the syndicated communal wagering game content to the social network server, and provide affiliate compensation to the social network server for betting losses incurred by the one or more social network user accounts during the online communal wagering game.

In some embodiments, the wagering game server further comprises: a social communications controller configured to control social communications between the one or more social network accounts hosted by the social network server in connection with the online communal wagering game, and a social economy controller configured to control transactions for exchangeable wagering items the one or more social network accounts.

In some embodiments, an apparatus comprises: a social network gaming module configured to determine a communal trading session associated with a wagering game session controlled by a wagering game server, determine a first social network user account connected to a social network, to connect the first social network user account to the communal trading session, to determine a request by the first social network user account to transact an exchange of one or more tradable wagering items with a second social network user account via one or more communal trading controls, to determine that the first social network account and the second social network user account agree to terms of exchange of the one or more tradable wagering items, and to transact the exchange of the one or more tradable wagering items between the first social network account and the second social network user account according to the terms of exchange.

In some embodiments, the social network gaming module is further configured to present the one or more communal trading controls on a first trading console belonging to a first wagering game interface on a first social network website, determine that the second social network user account is connected to a second social network website, connect the second social network user account to the communal trading session, and determine a response by the second social network user account to the request by the first social network user account, wherein the response includes receiving confirmation of the terms of exchange via one or more additional communal trading controls on a second trading console belonging to a second wagering game interface on the second social network website.

In some embodiments, tradable wagering items include one or more of wagering game items, virtual game assets, wagering game trophies, bonus game content, betting credits, rights to play wagering games, wagering game status points, leader board status for the communal wagering game, shared game points, social network points, social network items, social network privileges, personal items, files, services, virtual real estate, and virtual currency.

In some embodiments, the tradable items are earned during wagering game play and are stored in connection with one or more wagering game player accounts associated with one or more of the first social network user account and the second social network user account and wherein the social network gaming module is further configured to transfer the one or more tradable items between the one or more wagering game player accounts associated with one or more of the first social network user account and the second social network user account.

In some embodiments, an apparatus comprises means for aggregating a social network user account into a communal wagering game, wherein the social network user account is controlled by a social network server and wherein the communal wagering game is controlled by a wagering game server; means for receiving playing activity for the social network user account, wherein the playing activity is received via a wagering game interface presented on a social network website associated with the social network user account; means for transacting wagering activity for the communal wagering game based on the playing activity; means for providing social communication content associated with the communal wagering game; means for determining that the social network user account utilizes the social communication content; means for conducting a communication session between the social network user account and one or more additional social network user accounts; means for determining jurisdictional rules that govern gambling activity for the social network user account and the one or more additional social network user accounts; and means for controlling wagering activity conducted within the communication session according to the jurisdictional rules.

In some embodiments, the social communication content includes a social communication interface presented on the social network website, wherein the social communication interface is connected to a communal wagering game session and presented as a feature of the wagering game interface on the social network website.

In some embodiments, the apparatus further comprises means for receiving social communication data from the social network user account directed to the one or more additional social network user accounts; and means for presenting the social communication data to the one or more additional social network user accounts.

In some embodiments, the social communication content comprises one or more of a wagering game replay control, a news feeder of social network community events, a chat console, and a social economy console.

BRIEF DESCRIPTION OF THE DRAWING(S)

Embodiments are illustrated in the Figures of the accompanying drawings in which.

DESCRIPTION OF ILLUSTRATIVE EMBODIMENTS

Figure 1:
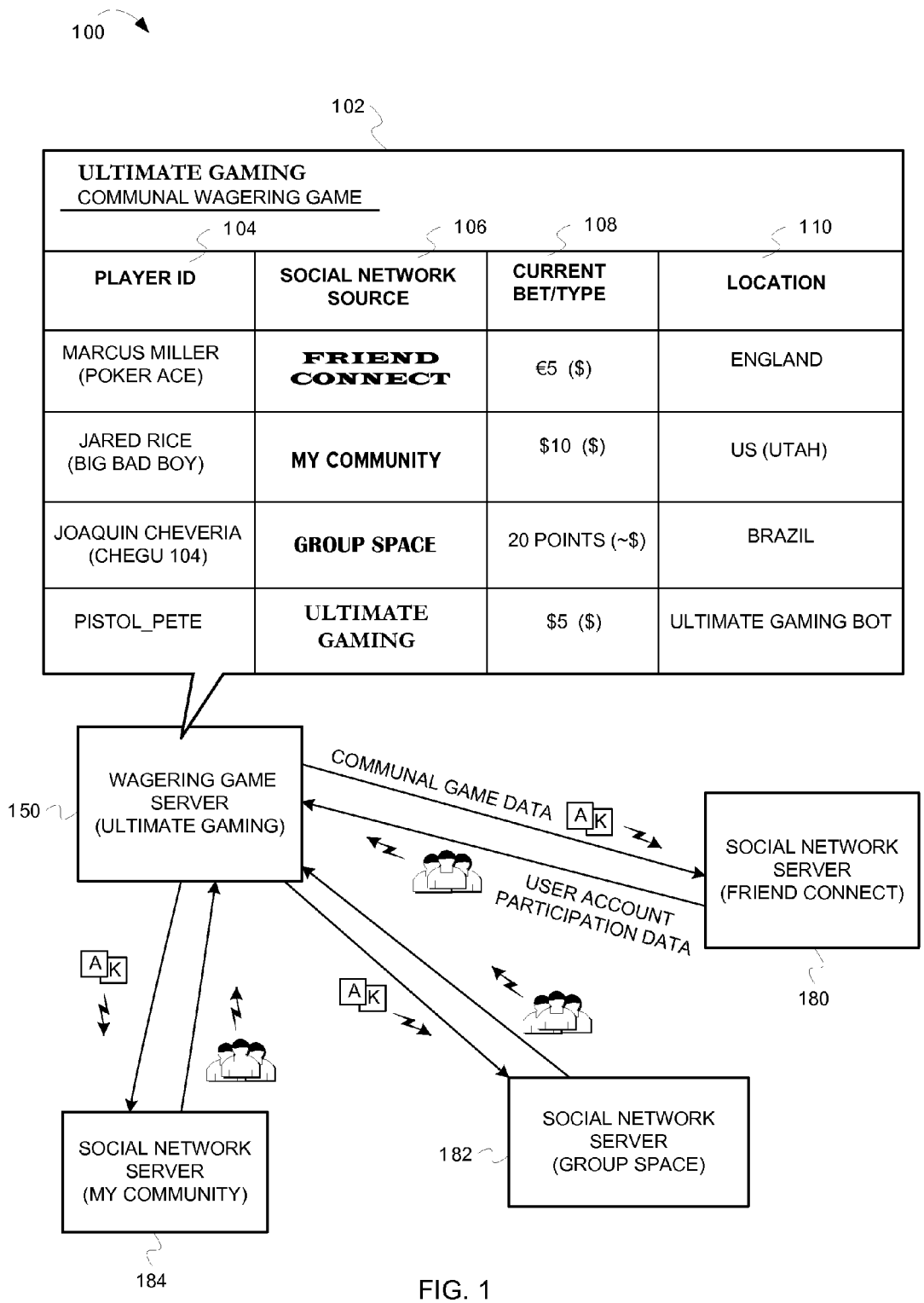
FIG. 1 is an illustration of aggregating social network accounts into a communal wagering game, according to some embodiments.

This description of the embodiments is divided into five sections. The first section provides an introduction to embodiments. The second section describes example operating environments while the third section describes example operations performed by some embodiments. The fourth section describes additional example operating environments while the fifth section presents some general comments.

INTRODUCTION

This section provides an introduction to some embodiments.

Social communication is on the rise. Internet users are enjoying a proliferation of social networking mechanisms (e.g., social network websites, online chats, blogging, social network applications, etc.) that are appearing online in vast quantities. Many of those Internet users are also wagering game enthusiasts. Wagering games are also expanding in popularity. Many wagering game enthusiasts are demanding greater access to wagering games and content related to wagering games, especially content that includes social networking. As stated previously, some wagering game companies have created online wagering game websites that provide a way for wagering game enthusiasts to play wagering games while connected to the Internet (e.g., via a web-browser). Some online wagering game websites provide various features, such as some social network functionality. Social network features, for example, allow wagering game players ("players") to create user accounts with one or more unique identifiers that represent an online persona. One example of a unique identifier is an "avatar". Avatars are graphical, "cartoon-like" depictions of a social network persona. These online personas and associated avatars add to the fun of belonging to a social network. Many online casinos, however, present an unsatisfactory wagering game experience to players who enjoy a more integrated gaming experience. Embodiments however, present examples of integrating social networking mechanisms with wagering games and network gaming venues (e.g., online casinos, a wagering game websites, wagering networks, etc.). Embodiments can be presented over any type of communications network (e.g., public or private) that provides access to wagering games, such as a website (e.g., via wide-area-networks, or WANs), a private gaming network (e.g., large-area-networks, or LANs), a file sharing networks, a social network, etc., or any combination of networks. Multiple users can be connected to the networks via computing devices. The multiple users can have accounts that subscribe to specific services, such as account-based wagering systems (e.g., account-based wagering game websites, account-based casino networks, etc.). In some embodiments herein a user may be referred to as a player (i.e., of wagering games), and a player may be referred to interchangeably as a player account. Account-based wagering systems utilize player accounts when transacting and performing activities, at the computer level, that are initiated by players. Therefore, a "player account" represents the player at a computerized level. The player account can perform actions via computerized instructions. For example, in some embodiments, a player account may be referred to as performing an action, controlling an item, communicating information, etc. Although a player, or person, may be activating a game control or device to perform the action, control the item, communicate the information, etc., the player account, at the computer level, can be associated with the player, and therefore any actions associated with the player can also be associated with the player account. Therefore, for brevity, to avoid having to describe the interconnection between player and player account in every instance, a "player account" may be referred to herein in either context. Further, in some embodiments herein, the word "gaming" is used interchangeably with "gambling".

FIG. 1 is a conceptual diagram that illustrates an example of aggregating social network accounts into a communal wagering game, according to some embodiments. In FIG. 1, a wagering game system ("system") 100 includes a wagering game server 150. The system 100 can also include a plurality of social network servers 180, 182, and 184, which can host different social networks. The social network servers 180, 182, and 184, can include other devices, servers, mechanisms, etc., that provide functionality (e.g., controls, web pages, applications, etc.) that social network users can use to connect to the different social networks and utilize social network features (e.g., communications mechanisms, applications, etc.). In some embodiments, the wagering game server 150 can generate and control a communal wagering game and provide communal wagering game content to the social network servers 180, 182, and 184. In some embodiments herein, the wagering game server 150, or other wagering game servers, may be referred to as "communal" wagering game servers because they provide community wagering games, where a group of social network community users can congregate, socialize, and play a wagering game. The wagering game server 150 can aggregate players from the social network servers 180, 182, and 184 into the communal wagering game. The wagering game server 150 can provide communal wagering game data ("communal game data") that the social network servers 180, 182, and 184 can use to present and control content for the communal wagering game. The social network servers 180, 182, and 184 can present the content for the communal wagering game within their own social network mechanisms (e.g., within user interfaces provided by their hosted social network websites) that social network user accounts access via the social network servers 180, 182, and 184. The social network servers 180, 182, and 184 can track the game playing activity and social communication activity of the social network users that are aggregated into the communal wagering game ("aggregated players"). The aggregated players can utilize the user interfaces from their respective social networks to play the communal wagering game and communicate with each other. The social network servers 180, 182, and 184 can send player account participation data to the wagering game server 150. The wagering game server 150 can use the player account participation data to connect the user accounts to the communal wagering game, to provide communal gaming services, and to provide community communications services (e.g., conduct the communal wagering game, control betting, determine jurisdictional restrictions for player accounts, provide social communications features, track social communications between players, present group statistics on community leader boards, provide filtered chat sessions, publish game replays, publish community events, provide a social economy, etc.). The social network servers 180, 182, and 184 can assist the wagering game server 150 in presenting and, in some cases, controlling, the community services. Other embodiments will be discussed further below and may refer back to FIG. 1.

Although FIG. 1 describes some embodiments, the following sections describe many other features and embodiments.

Example Operating Environments

This section describes example operating environments and networks and presents structural aspects of some embodiments. More specifically, this section includes discussion about wagering game system architectures.

Wagering Game System Architecture

Figure 2:
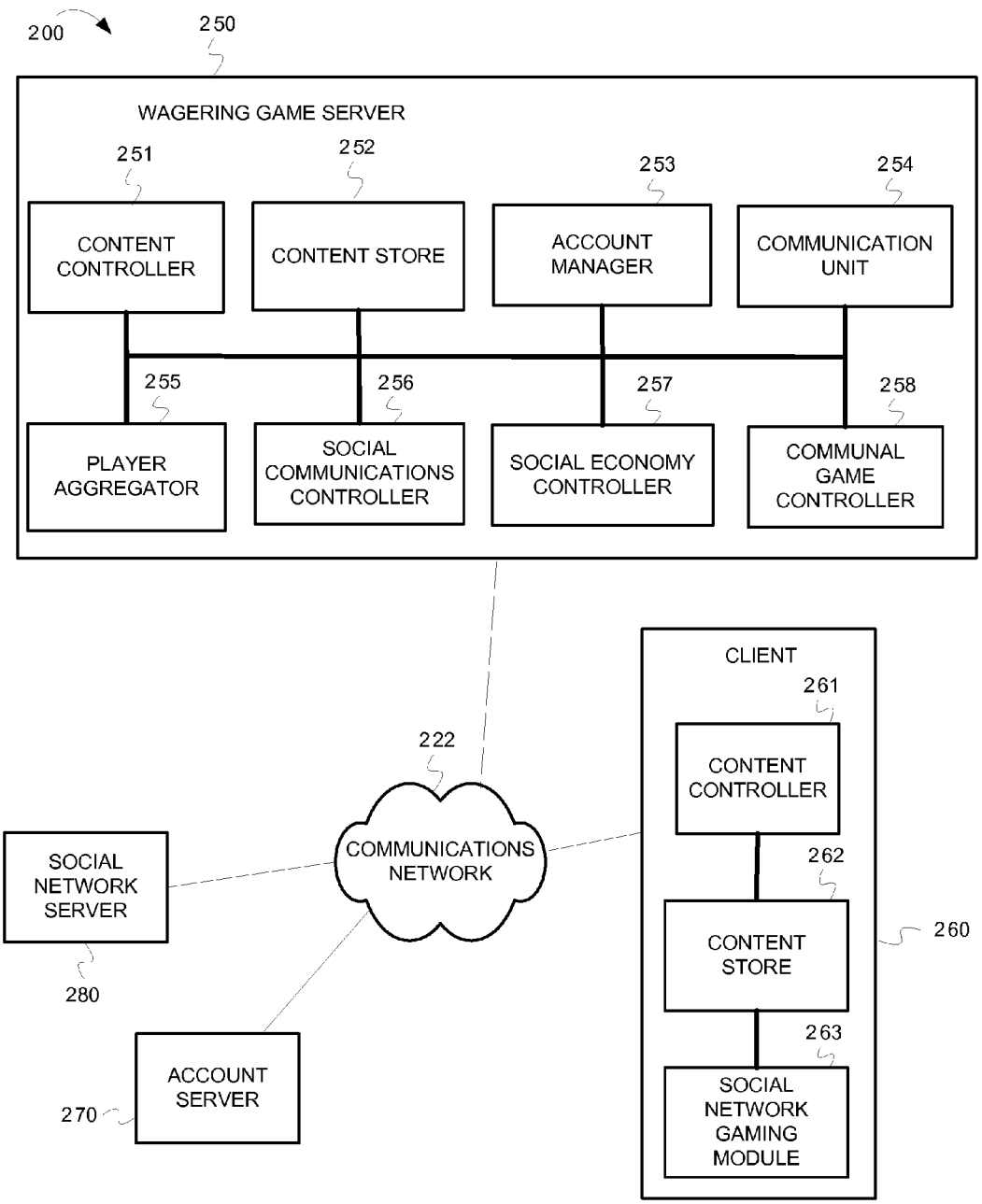
FIG. 2 is an illustration of a wagering game system architecture 200, according to some embodiments.

FIG. 2 is a conceptual diagram that illustrates an example of a wagering game system architecture 200, according to some embodiments. In FIG. 2, the wagering game system architecture 200 can include an account server 270 configured to control user related accounts accessible via wagering game networks and social networks. The account server 270 can store wagering game player account information, such as account settings (e.g., betting settings related to communal wagering games, settings related to community event publications, settings related to chat filters, settings related to social trading, etc.), preferences, player profile data, and other information for a player's account. The account server 270 can store and track player information, such as identifying information (e.g., avatars, screen name, account identification numbers, etc.) or other information like financial account information, social contact information, etc. The account server 270 can contain accounts for social contacts referenced by the player account. The account server 270 can also provide auditing capabilities, according to regulatory rules, and track the performance of players, machines, and servers.

The wagering game system architecture 200 can also include a wagering game server 250 configured to control wagering game content, provide random numbers, and communicate wagering game information, account information, and other information to and from a client 260. The wagering game server 250 can include a content controller 251 configured to manage and control content for the presentation of content on the client 260. For example, the content controller 251 can generate game results (e.g., win/loss values), including win amounts, for games played on the client 260. The content controller 251 can communicate the game results to the client 260. The content controller 251 can also generate random numbers and provide them to the client 260 so that the client 260 can generate game results. The wagering game server 250 can also include a content store 252 configured to contain content to present on the client 260. The wagering game server 250 can also include an account manager 253 configured to control information related to player accounts. For example, the account manager 253 can communicate wager amounts, game results amounts (e.g., win amounts), bonus game amounts, etc., to the account server 270. The wagering game server 250 can also include a communication unit 254 configured to communicate information to the client 260 and to communicate with other systems, devices and networks. The wagering game server 250 can also include a player aggregator 255 configured to aggregate players from social networks into communal wagering games hosted by the wagering game server 250. The wagering game server 250 can also include a social communications controller 256 configured to control social communications functions between social network user accounts across varying social networks, websites, etc. The wagering game server 250 can also include a social economy controller 257 configured to control exchanges, trades, and other transactions for exchangeable items between social network user accounts. The wagering game server 250 can also include a communal game controller 258 configured to control content, betting, accounting transactions, etc. associated with a communal wagering game.

The wagering game system architecture 200 can also include the client 260 configured to present wagering games and receive and transmit information to integrate social communities and wagering games. The client 260 can be a computer system, a personal digital assistant (PDA), a cell phone, a laptop, a wagering game machine, or any other device or machine that is capable of processing information, instructions, or other data provided via a communications network 222. The client 260 can include a content controller 261 configured to manage and control content and presentation of content on the client 260. The client 260 can also include a content store 262 configured to contain content to present on the client 260. The client 260 can also include a social network gaming module 263 configured to control presentation of wagering games via social network venues, wagering game venues, etc. The social network gaming module 263 can also present and control player activity for communal wagering games, social communications between players, exchanges of tradable items, etc.

The wagering game system architecture 200 can also include a social network server 280 configured to host social network accounts, provide social network content, control social network communications, store associated social contacts, etc.

Each component shown in the wagering game system architecture 200 is shown as a separate and distinct element connected via the communications network 222. However, some functions performed by one component could be performed by other components. For example, the wagering game server 250 can also be configured to perform functions of the social network gaming module 263, and other network elements and/or system devices. Furthermore, the components shown may all be contained in one device, but some, or all, may be included in, or performed by multiple devices, as in the configurations shown in FIG. 2 or other configurations not shown. For example, the account manager 253 and the communication unit 254 can be included in the client 260 instead of, or in addition to, being a part of the wagering game server 250. Further, in some embodiments, the client 260 can determine wagering game outcomes, generate random numbers, etc. instead of, or in addition to, the wagering game server 250.

As mentioned previously, in some embodiments, the client 260 can take the form of a wagering game machine. Examples of wagering game machines can include floor standing models, handheld mobile units, bar-top models, workstation-type console models, surface computing machines, etc. Further, wagering game machines can be primarily dedicated for use in conducting wagering games, or can include non-dedicated devices, such as mobile phones, personal digital assistants, personal computers, etc.

In some embodiments, clients and wagering game servers work together such that a client can be operated as a thin, thick, or intermediate client. For example, one or more elements of game play may be controlled by the client or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the client can present a graphical representation of such outcome or asset modification to the user (e.g., player). In a thick-client example, the client can determine game outcomes and communicate the outcomes to the wagering game server for recording or managing a player's account.

In some embodiments, either the client or the wagering game server(s) can provide functionality that is not directly related to game play. For example, account transactions and account rules may be managed centrally (e.g., by the wagering game server(s)) or locally (e.g., by the client). Other functionality not directly related to game play may include power management, presentation of advertising, software or firmware updates, system quality or security checks, etc.

Furthermore, the wagering game system architecture 200 can be implemented as software, hardware, any combination thereof, or other forms of embodiments not listed. For example, any of the network components (e.g., the clients, servers, etc.) can include hardware and machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 3:
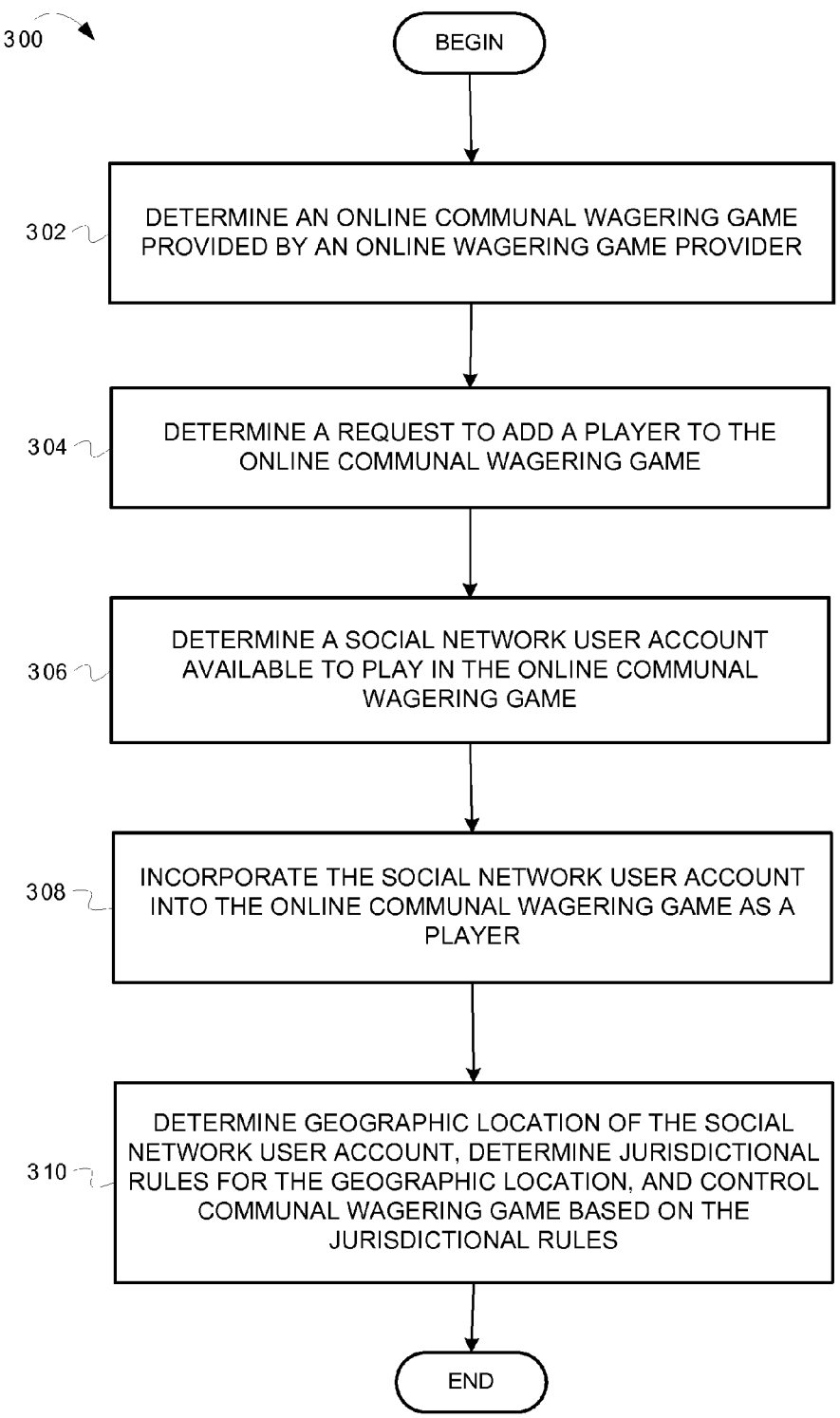
FIG. 3 is a flow diagram 300 illustrating integrating social network users into communal wagering games, according to some embodiments.

FIG. 3 is a flow diagram ("flow") 300 illustrating integrating social network users into communal wagering games, according to some embodiments. FIG. 1 is a conceptual diagram that helps illustrate the flow of FIG. 3, according to some embodiments. This description will present FIG. 3 in concert with FIG. 1. In FIG. 3, the flow 300 begins at processing block 302, where a wagering game system ("system") determines an online communal wagering game provided by a wagering game provider. The online communal wagering game can be a wagering game that a group of players can play at the same time. The system can control all activities of the communal wagering game (e.g., controls the number of players who are allowed to play the group game, controls who is allowed to bet, controls when bets are placed, controls when game outcomes are produced, controls which players receive payouts, etc.). The system can aggregate players from various websites into the communal wagering game. The system can gather a large group of players from different sites into a unified virtual location, such as a website hosted by the wagering game provider. In other embodiments, the wagering game provider, however, provides content to social network websites to present the communal wagering game to the social network patrons. The social network website can provide the wagering game provider with player accounts (e.g., connection data to connect player accounts) to the communal wagering game. The social network patrons then play the communal game on the various social network websites using user interfaces provided by the social network websites. The social network websites, however, may receive communal game content from the wagering game provider, and may integrate the communal game content into the user interfaces available on the social network websites. The wagering game provider can also provide other services, besides the communal wagering game, for the players to communicate and socialize with each other. Thus, the system can incorporate user accounts from different websites into a single communal wagering game.

The flow 300 continues at processing block 304, where the system determines a request to add a player to the online communal wagering game. For example, the system can determine a need to collect more players into a wagering game, such as a need to meet a minimum number requirement of players. Some wagering games may have set limits to players that can play based on game rules. In other embodiments, the system may detect a request by a player to invite friends that are logged on as social network user accounts to social network websites. The system can present controls for players to invite their friends, or other social contacts, associated with their social network.

The flow 300 continues at processing block 306, where the system determines one or more social network user account(s) available to play in the online communal wagering game. The system can search across social network websites, wagering game websites, and other locations, to find players playing a similar game. The system can later aggregate the smaller groups into a larger group of players for the communal wagering game. In some embodiments, the system can find players playing different games, or find social network accounts that are currently logged on to their respective social networks and which have indicated a desire to join communal games when available. The system can determine whether the social network user account(s) are willing to enter the communal wagering game. For example, the system can check settings set by the social network user account(s), which settings indicate certain types of games that the social network user account(s) want to play. The system can also send out invitations and determine whether social network user account(s) has accepted the invitation. In some embodiments, the system can determine when some of the social network user account(s) manually indicate a desire to play the communal wagering game.

The flow 300 continues at processing block 308, where the system incorporates the social network user account(s) into the online communal wagering game as one or more players. In some embodiments, when the system finds that the social network user account(s) are available to play, the system can aggregate the social network user account(s) into the communal wagering game. A social network provider can provide the social network user account(s). However, the wagering game provider can provide one or more wagering game player account(s) to match up with the social network user account(s) and that the system can use to transact wagers and perform account related activities. FIG. 1 illustrates an example of a communal gaming account 102 controlled by the wagering game server 150. The wagering game server 150 can provide wagering game services for a wagering game provider (e.g., the fictitious online game provider "Ultimate Gaming"). The wagering game server 150 can aggregate players for a communal wagering game connected to the communal gaming account 102. The players can be social network users from the social network servers 180, 182, and 184. Each of the social network servers 180, 182, and 184 can control social network services from multiple different social network providers (e.g., respectively the fictitious social network providers "Friend Connect," "Group Space," and "My Community"). The wagering game server 150 receives account information for multiple separate social network accounts (e.g. Marcus Miller from Friend Connect, Jared Rice from My Community, and Joaquin Cheveria from Group Space). The wagering game server 150 can determine wagering game accounts for the social network accounts to use during the communal wagering game (e.g., assign guest accounts, determine that social network accounts have corresponding wagering game accounts, require social network user accounts to register wagering game accounts, etc.). For example, the system determines that Marcus Miller is associated with the wagering game account for "Poker Ace," Jared Rice with the wagering game account for "Big Bad Boy," and Joaquin Cheveria with the wagering game account for "CheGu104." The wagering game server 150 can store identifying information 104 for the social network user accounts and the player accounts within the communal gaming account 102. The wagering game server 150 can store other information, such as a social network source 106, a location 110 of the player, a current bet 108 for the player, a type of the bet (e.g., cash money, play money, points, etc.) and other information that the wagering game server 150 uses to control the communal wagering game. In some embodiments, the system 100 can provide one or more wagering game provider funded bots in the communal wagering game (e.g., Pistol Pete who is an Ultimate gaming Bot). In some embodiments, the bots can be automated, system controlled players that masquerade as real live players within the communal wagering game. In some embodiments, the bots can be real live players that are gambling, but that use wagering game provider's funds (e.g., marketing dollars). The social network servers 180, 182, 184 can provide connection data for the social network user account(s). The wagering game server 150 can receive the connection data for the social network user account(s) and use the connection data to connect the social network user account(s) to an online communal gaming session for the communal gaming account 102. The system 100 can receive playing activity for the social network user account(s), as received from the social network servers 180, 182, and 184. The system 100 can transact wagers based on the playing activity of the social network user account(s). In some embodiments, the wagering game server 150 can provide online communal wagering game data to the social network servers 180, 182, and 184 that control the social network user account(s). Online communal wagering game data can include game content, social communication functions, social communication data, accounting data, license data, subscription data, application interface data, game results, etc. For example, the system 100 can provide a service for, or syndicate, shared games, content, features, etc. to social network websites hosted by the social network servers 180, 182, and 184. The system 100 can provide a subscription fee to the social network servers 180, 182, and 184 to receive game content for the online communal wagering game. The social network servers 180, 182, and 184 can present the communal wagering game content using the online communal wagering game data. In some embodiments, the social network servers 180, 182, and 184 can present their own social game(s), but receive results from other players that are not connected to the communal wagering game (e.g., receive results from other players of other social networks that are connected via the wagering game provider) and provide results, activity, etc. of the other players through the social network's own game interface. The system 100 can control a central account for social network user accounts (e.g., the communal gaming account 102) and can link the social network user accounts into the central account for the online communal wagering game. The system 100 can transfer money from the social network user accounts into the central account and can track virtual transactions during the communal wagering game. The system 100 can transfer pre-funded amounts of money, variable amounts, etc. The system 100 can reconcile the various social network user accounts at the end of the communal wagering game or at periodic intervals through the communal wagering game. In some embodiments, the system 100 can receive social communication data directed between social network user accounts connected to the online communal wagering game. The system 100 can use social communication control features (e.g., chat controls) provided by the social network servers 180, 182, and 184. The system 100 can control the social communication data and provide a common infrastructure for social network user accounts from the different social network websites to communicate with each other. In some embodiments, the system 100 can provide tiers of service that successful players (e.g., highest spending, most points, most games played, etc.) would be able to play.

The flow continues at processing block 310, where the system determines a geographic location of the social network user account, determines jurisdictional rules for the geographic location, and controls the communal wagering game based on the jurisdictional rules. For example, in FIG. 1, the system 100 can determine geographic locations 110 for the social network user accounts, determine jurisdictional rules for conducting wagering games for the geographic locations 110, and control wagering functions, wagering transactions, betting restrictions, payouts, side-bets, and other gaming activity for the social network user account in the online communal wagering game based on the jurisdictional rules. For example, in jurisdictions where wagering games are allowed online, the system 100 can conduct cash, or monetary wagers. In jurisdictions where wagering games are not allowed, the system 100 can conduct non-monetary compensation (e.g., conduct "play" money wagers, points) or non-cash wagers (e.g., wagering points between players, etc.). The system 100 can aggregate players for different prizes (e.g., monetary and non-monetary) depending on the geographic location of where the players are aggregated from (e.g., their jurisdictional rules for the geographic location). Rules can vary for each jurisdiction (e.g., per country, pre region of the country, etc.) The system 100 can determine the location 110 of each player account and refer to rules for that jurisdiction regarding bet values, bet types, buy-in values, pay-out types, etc. For example, when the system 100 aggregates a player account from a social network, the system 100 can check the rules of the jurisdiction and determine an appropriate buy-in value for the game. If the jurisdiction allows cash buy-ins, the system 100 can check game rules and determine the current cash buy-in values for the game and present options for the player to transaction a cash buy-in. In other jurisdictions, however, where gambling for cash is not allowed, the system 100 can present options to utilize play money (no-value) or points (e.g., entertainment or customer appreciation points). The system 100 can mirror the payouts to the buy-ins (e.g., cash buy-in gets cash payout, points pay-in get points payout). In some embodiments, the system 100 can provide affiliate compensation to the social network servers 180, 182, and 184 for providing social network user account. The system 100 can split wagering, or betting, losses for the social network user accounts during wagering game play of the communal wagering game. The system 100 can work with affiliate websites to drive traffic to the game provider site and provide compensation to the affiliate. The system 100 can also gather data (e.g., marketing research, etc.) from the various social network user accounts controlled by the social network servers 180, 182, and 184.

Figure 4:
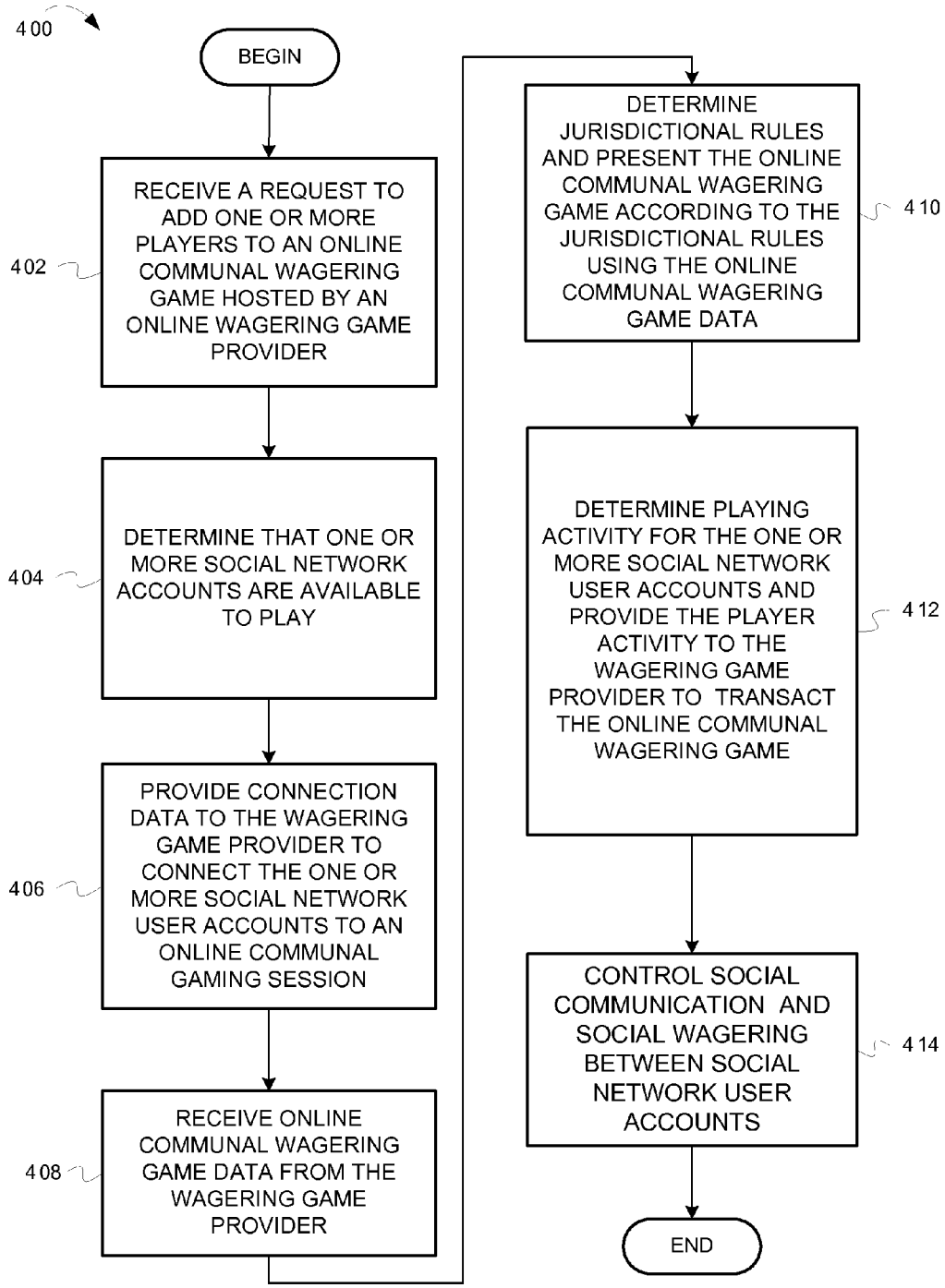
FIG. 4 is a flow diagram 400 illustrating providing social network users for communal gaming, according to some embodiments.
Figure 5:
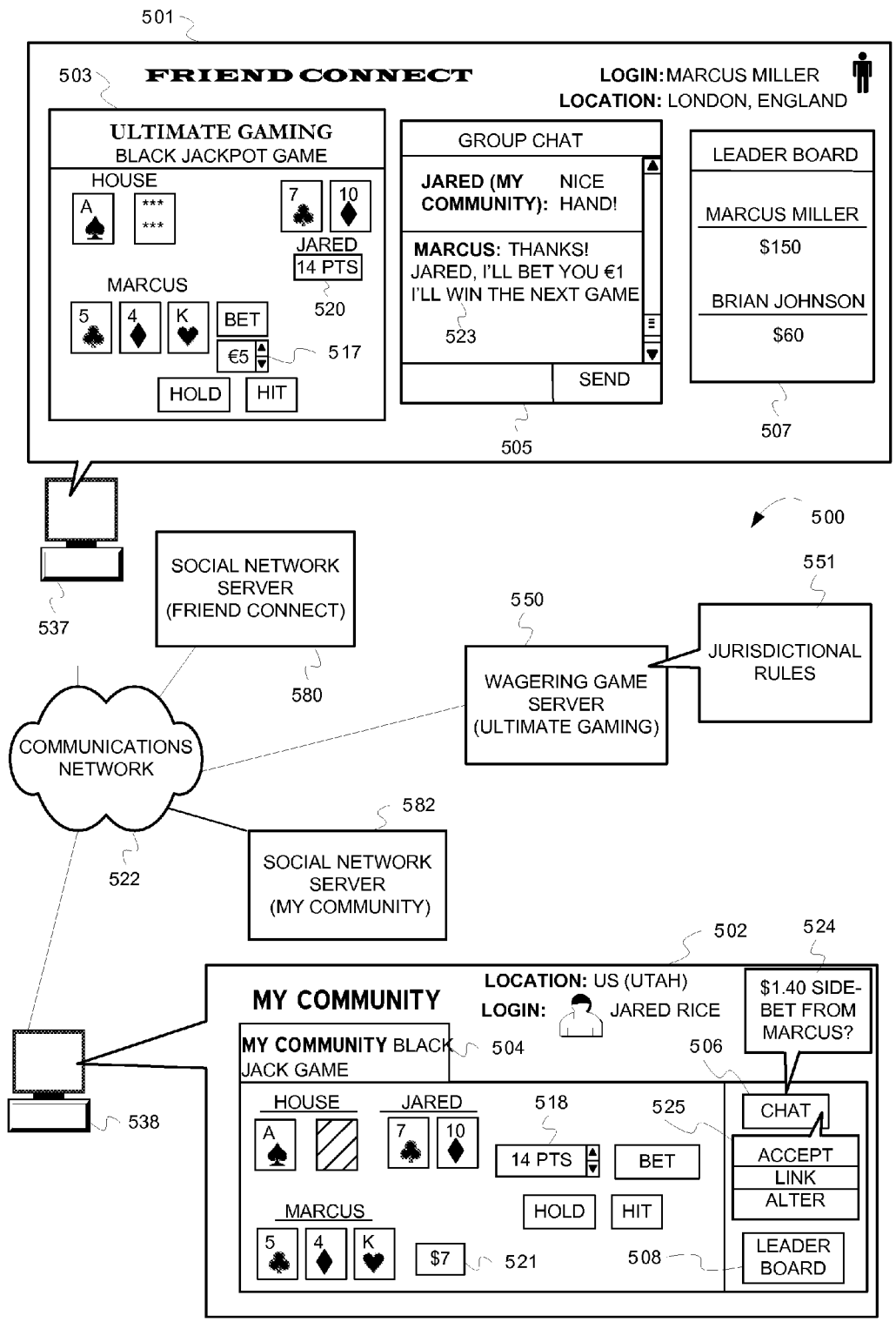
FIG. 5 is an illustration of integrating social network game data and social communication data into communal wagering games, according to some embodiments.

FIG. 4 is a flow diagram ("flow") 400 illustrating providing social network users for communal gaming, according to some embodiments. FIG. 5 is a conceptual diagram that helps illustrate the flow of FIG. 4, according to some embodiments. This description will present FIG. 4 in concert with FIG. 5. In FIG. 4, the flow 400 includes processing blocks that a social network provider's system ("social network system") can perform in concurrence with the flow 300 above. For instance, social network system can be social network website (e.g., FaceBook™, MySpace™, etc.) a massive multi-player online website, a group blog, or any other social network type of website. In some embodiments, a wagering game system can perform the processing when connected to, or with authorization of a social network system. In some embodiments, the social network system is separate from the wagering game system (e.g., separate servers, separate websites, etc.). In some embodiments, a third-party system can provide the processing with authorization from the social network system and/or the wagering game system. However, for brevity, in connection with flow 400, a "system" (e.g., a social network system, a wagering game system, a third-party system, or some collaboration) will be described as performing processing. The flow 400 begins at processing block 402, where the system receives a request to add one or more players to an online communal wagering game hosted by a wagering game provider.

The flow 400 continues at processing block 404, where the system determines that one or more social network accounts are available to play.

The flow 400 continues at processing block 406, where the system provides connection data to the online wagering game provider to connect the one or more social network user accounts to an online communal gaming session.

The flow 400 continues at processing block 408, where the system receives online communal wagering game data from the wagering game provider.

The flow 400 continues at processing block 410, where the system determines jurisdictional rules and presents the online communal wagering game according to the jurisdictional rules using the online communal wagering game data. The system can present the online communal wagering game on an online communal wagering game interface in association with the social network provider (e.g., on a social network website). FIG. 5 illustrates an example of presenting a communal wagering game on two online communal wagering game interfaces ("communal game interfaces") for different social network providers. In FIG. 5, a wagering game system ("system") 500 includes a wagering game server 550 connected to social network servers 580 and 582 via a communications network 522. The system 500 can also include computer systems ("computers") 537 and 538 also connected to the communications network 522. The wagering game server 550 can host a wagering game provider website (e.g., the Ultimate Gaming, online casino website). The social network servers 580 and 582 can host separate social network websites (e.g., the Friend Connect website and the My Community website). The computers 537 and 538 can present displays 501 and 502 of the social network websites. For example, the computer 537 can present the display 501 of the Friend Connect website. A social network user (e.g., Marcus Miller) can be connected to a social network user account (e.g., Marcus Miller's Friend Connect user account) via the computer 537. The Marcus Miller social network user account can be from a first geographic location (e.g., London, England). A separate user (e.g., Jared Rice) can be connected to a separate social network user account (e.g., Jared Rice's My Community user account) via the computer 538. The Jared Rice social network user account can be from a second geographic location (e.g., the State of Utah in the United States of America). The system 500 can determine geographic locations by tracking IP addresses provided by the computers 537 and 538 and/or their Internet providers' computers. The computer 538 can present the display 502 of the My Community website. In some embodiments, the wagering game server 550 provides a communal wagering game application 503 (e.g., the Ultimate Gaming Black Jackpot Game) that the social network server 580 provides to the computer 537. The computer 537 presents the communal wagering game application 503 on the display 501. At the same time, however, the social network server 582 does not receive the communal wagering game application 503. Instead, the social network server 582 provides its own content, which is a social game application 504 (e.g., the My Community Black Jack Game) that is similar in content to the communal wagering game application 503, and which provides community game playing functionality similar to that provided by the communal wagering game application 503. For example, the communal wagering game application 503 and the social game application 504 are both Blackjack type games. Both games provide similar functionality (e.g., the ability to Hit, Hold, Bet, etc.). However, the communal wagering game application 503 may present Blackjack content in a way that looks and functions slightly differently from the social game application 504 (e.g., the positioning of Hit, Hold, and Bet controls are different, the money format for wagers is different, the card face fonts and backs appear different, the backgrounds of the games are different, the games play different sounds and cause different visual affects to appear, social communication features look and react differently, etc.). The system 500 can refer to jurisdictional rules 551 when presenting information in the communal wagering game application 503. For instance, the system 500 refers to the jurisdictional rules 551 and provides appropriate wagering controls, descriptions, and functionality to the communal wagering game application 503 based on whether the jurisdiction allows for cash gambling. As an example, the Marcus Miller social network user account is located in England, which may allow for cash gambling on the Internet. As a result, the system 500 provides instructions to the communal wagering game application 503 to present a cash wagering control 517 (e.g., Marcus Miller opted to buy-in with cash, so the communal wagering game application 503 presents the cash wagering control 517 as a cash meter). Concurrently, the system 500 can determine that the Jared Rice social network user account is in a jurisdiction that does not allow cash gambling via the Internet, and, thus presents a wagering control 518 in the social game application 504 that does not allow for cash betting. The wagering control 518 can allow for a wager-type that the user selected at the buy-in stage of the game (e.g., Jared Rice opted to buy-in with points and thus the social game application 504 presents the wagering control 518 as a point meter). In some embodiments, the My Community social website can redeem the points earned for cash, or other values. For instance, although some jurisdictions may not allow for person to person gambling via the Internet, or gambling via specific wagering games, the jurisdictions may allow for competitions using points, where the highest points leader at the end of a competition period may win a cash prize. However, the wagering game server 550 provides communal game data to both the social network servers 580 and 582 based on the activity performed by the respective social network user accounts of the different social network servers 580 and 582.

The flow 400 continues at processing block 412, where the system determines playing activity for the one or more social network user accounts via the online communal wagering game interface associated with the social network provider and provides the player activity to the wagering game provider to transact the online communal wagering game. For example, in FIG. 5, as stated previously, the wagering game server 550 provides communal game data to both the social network servers 580 and 582 based on the activity performed by the respective social network user accounts of the different social network servers 580 and 582. The social network servers 580 and 582 can use the communal game data to present similar game outcomes (e.g., the same Blackjack hands for the respective players), equivalent bet amounts, etc. so that the social network user accounts receive and present the same game play of all users accounts connected to the communal wagering game. Further, the social network servers 580 and 582 provide account connection data and player activity data to the wagering game server 550 to process and coordinate communal wagering game play. In an example, the player Marcus Miller may be situated in England, and the communal wagering game application 503 may be specially configured for presentation of money values in Euros (€) instead of United States (U.S.) Dollars ($). Thus, the Marcus Miller social network account may bet € 5, and the cash wagering control 517 shows € 5. The wagering game server 550, however, can receive the € 5 bet and convert the amount to an equivalent U.S. Dollar amount. The Jared Rice social network account may be situated in the United States, or some other jurisdiction that utilizes U.S. Dollars as a standard form of currency, and the social game application 504 may present bets in a U.S. Dollar format. Thus, the wagering game server 550 presents communal game data that includes the converted bet amount (e.g., from € 5 to $7 based on a current exchange rate). The social game application 504 can receive the communal game data and can pass the value of the bet amount to the social game application 504 (e.g., via an application programming interface communication), to present on a graphical user interface associated with the social game application 504. The social game application 504 thus presents the converted bet amount in a U.S. Dollar format (e.g., $7) within an observational meter 521. The same processing can occur in reverse for bet amounts made by the Jared Rice social network user account if the Jared Rice social network user account were in a jurisdiction that allows for cash betting. The wagering game server 550 could convert a bet from U.S. Dollars to Euros and provide communal game data that the communal wagering game application 503 could present as Euros. In embodiments where the Jared Rice social network account is in a jurisdiction that does not allow cash betting in some circumstances, the system 500 may present the point amounts in an observational meter 520 without any conversions to the point amounts. Thus, in some embodiments, the system 500 can allow players to stay on their own social network websites after being aggregated into the communal wagering game, and maintain the look and feel of the communal wagering game from the social network websites.

The flow 400 continues at processing block 414, where the system controls social communication and social wagering between social network user accounts. For example, the system can provide social communication functionality in an online communal wagering game interface. In FIG. 5, the system 500 presents chat interfaces in connection with the communal wagering game (e.g., a chat console 505 of the communal wagering game application 503, and a chat control 506 of the social game application 504). The social network user accounts can use the chat interfaces to communicate with each other. For example, the chat console 505 can receive social communication data from the Marcus Miller social network user account social. The social network server 582 can then provide the social communication data to the wagering game server 550 to communicate to the social network server 582. The social network server 582 can then provide the social communication data to the computer 538, which presents the chat information using the chat control 506. In some embodiments, the system 500 can transact social wagers (e.g., side-bets) between players. For example, the Marcus Miller social network user account can indicate in the chat console 505 a side-bet challenge 523. The system 500 can communicate the side-bet challenge 523 and present it in a message 524 associated with the chat console 506. The message 524 can indicate the amount of the side-bet challenge 523. The system 500 can convert bet amounts to match the currency format of Jared Rice's geographic location (e.g., convert the € 1 side-bet amount to a $1.40 dollar amount, or equivalent exchange rate value at the time). The system 500 can determine, from the jurisdictional rules 551, restrictions on player-to-player betting. For instance, in some jurisdictions, group betting or wagering game betting may not be permitted, but player-to-player betting may be permitted. In some embodiments, the system 500 can aggregate and segregate players based on friends, certain demographics, etc. The system 500 can rely on player settings (e.g., see chat settings console 812 in FIG. 8) to determine how to segregate players or features, such as chat groups, in connection with communal wagering games. In some embodiments, the system 500 can aggregate non-play features from across websites (e.g., social communication features, community event notifications, news feeds, "happy-hour" presentations, instant messaging applications, etc.) as well as game related features (e.g., group bonuses, mystery bonuses, additional games, game replays, etc.). In some embodiments, the system 500 can present player activity from other players (e.g., scores, bets, leader boards, etc.). For example, the system 500 presents a shared leader board (e.g., leader board console 507 and leader board control 508) of the aggregated players showing wins, points, or any other features related to scores between players. In some embodiments, the social communication features, non-play features and game-related features can all be content that is licensed by the wagering game server 550. In some embodiments, however, the social communication features, non-play features and game-related features can belong to the social network servers 580 and 582, but can integrate (e.g., via API connection) to a communal wagering game service provided by the wagering game server 550. Consequently, the wagering game server 550 can provide application interface data to the social network servers 580 and 582 to initialize a communal wagering game, transfer data, communicate data to applications, respond to control information, transact bets, transfer accounting data, etc. In some embodiments, the system 500 can embed and/or respond to embedded content. For example, the system can utilize embedded software or embedded content (e.g., embedded YouTube™ video links). The system 500 can insert embedded links into webpages for the social network servers 580 and 582. In some embodiments, the system 500 can delegate authority and/or receive delegated authority to access and use data from social network websites. For example, the social network servers 580 and 582 can authorize the wagering game server 550 to access and use social network user accounts. In return, the wagering game server 550 can authorize the social network servers 580 and 582 to access and use content, communal game data, social communication data, etc.

Figure 6:
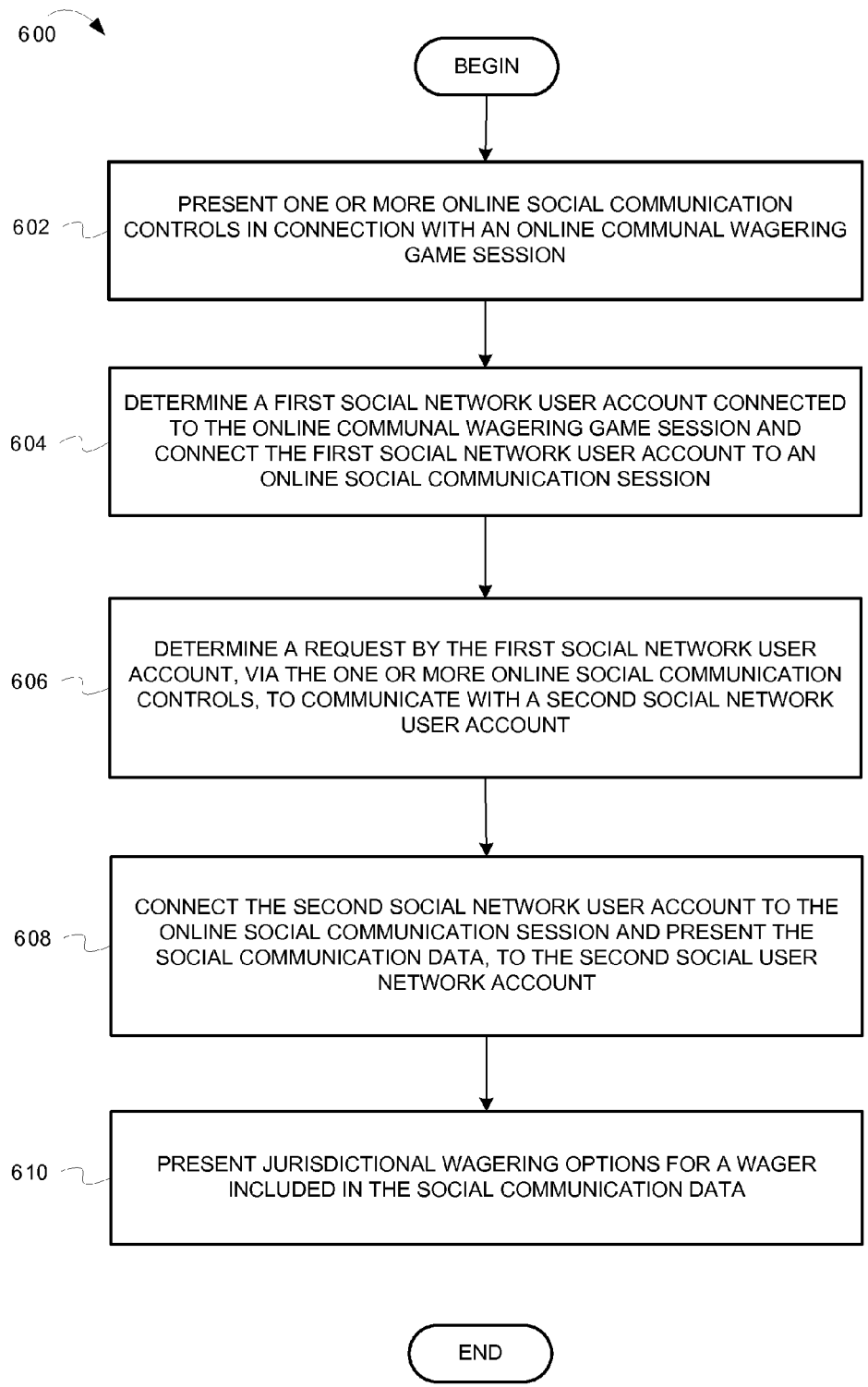
FIG. 6 is a flow diagram 600 illustrating controlling social network communications via wagering network functionality, according to some embodiments.
Figure 8:
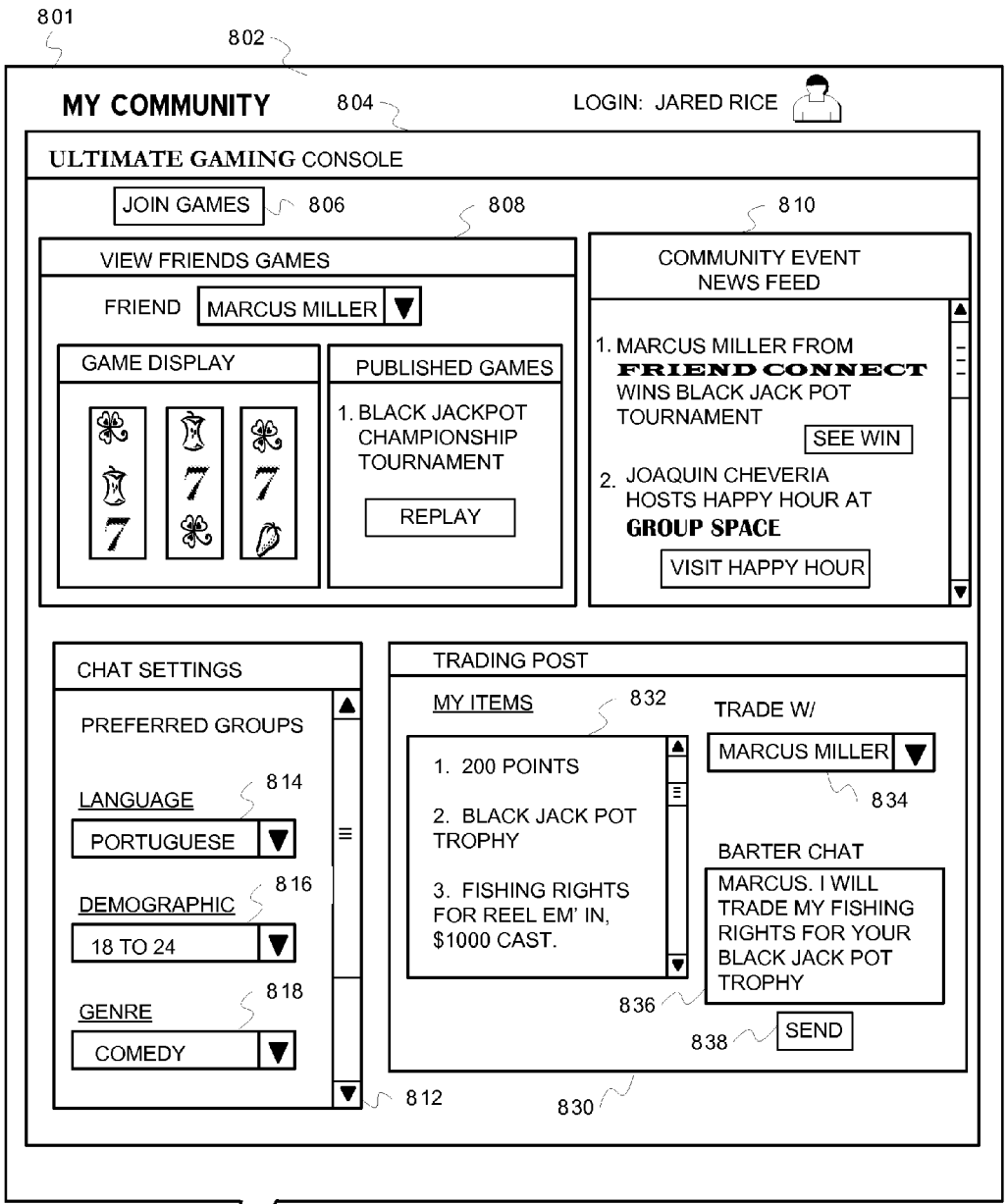
FIG. 8 is an illustration of configuring a wagering game player account with social community functionality, according to some embodiments.
Figure 8:
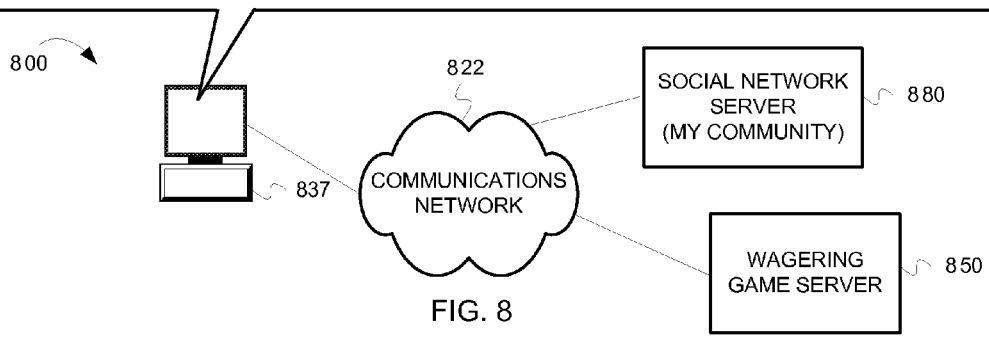

FIG. 6 is a flow diagram ("flow") 600 illustrating controlling social network communications via wagering network functionality, according to some embodiments. FIGS. 5 and 8 are conceptual diagrams that helps illustrate the flow of FIG. 6, according to some embodiments. This description will present FIG. 6 in concert with FIGS. 5 and 8. In FIG. 6, the flow 600 begins at processing block 602, where a wagering game system ("system") presents one or more online social communication controls in connection with an online communal wagering game session. In some embodiments, the online social communication session is connected to a communal wagering game controlled by a wagering game provider (e.g., casino website, online gaming venue, gaming division of social network). The system can present the social communication controls on a website associated with a social network provider. In some embodiments, a wagering game provider controls provides social networking. In other embodiments, however, the social network provider is a separate entity from the wagering game provider, and includes separate servers, user accounts, etc.

The flow 600 continues at processing block 604, where the system determines a first social network user account connected to the online communal wagering game session and connects the first social network user account to an online social communication session. In some embodiments, the system can present the one or more online social communication functions to the first social network user account via a first user interface on a social network website (e.g., see the displays 501 and 502 in FIG. 5). The system can determine that the first social network user account utilizes controls to communicate socially with other accounts (e.g., enters text in a text field, hits the send button, etc.). For example, in FIG. 5, the system determines that the Marcus Miller social network user account enters chat text into the chat console 505. In some embodiments, the system can present a multitude of features that include social communication. FIG. 8 illustrates an example social network user account interface ("account interface") 802 with a multitude of social communication features according to embodiments. In FIG. 8, a wagering game system ("system") 800 includes a computer 837 connected to a wagering game server 850 and a social network server 880 via a communications network 822. The computer 837 presents a display 801 of the account interface 802. The account interface 802 is for a social network user account (e.g., the Jared Rice account connected to the social network server 880 for the social network provider My Community) to receive and send social communications via an integrated wagering game console ("wagering game console") 804 (e.g., a game console from Ultimate Gaming that appears when the social network user account for Jared Rice logs in to the My Community website). The wagering game console 804 includes various features that are related to communal wagering games and social communications between wagering game players and social network users from other social network websites that also utilize an instance of the wagering game console 804. The wagering game console 804 includes a game control 806 for the social network user account to access and player wagering games from a wagering game provider (e.g., from Ultimate Gaming). The wagering game console 804 also includes a game replay console 808, which the social network user account can use to replay wagering games from friends or other social contacts associated with the social network user account. The wagering game console 804 also includes a community event news feed 810 that presents events of interest across social networks related to gaming. For example, a wagering game player may have won a jackpot, or social network user account may host or sponsor a "happy hour" at a specific social network website or a wagering game website. In some embodiments, the happy hour could be online, a real-world location (e.g., a bar), or a combination of the two. In some embodiments, the system can provide functionality for the social network user to invite multiple persons to online happy hour and/or to the social gathering. The system can provide levels of access to the happy hour including providing access to the online gathering for some individuals (e.g., for VIPs) while others only receive invitations to the real-world location, or vice versa. In some embodiments, the system sends the information to the bar, club, or other establishment that provides for a social gathering. In some embodiments, the establishment, or other entity, can sponsor the social gathering as well as the online happy hour website party. The wagering game console 804 also includes a chat settings console 812 that includes preferred chat filters, or groupings that the social network user account prefers for chat options. The chat filters may include preference related to language, demographics, topical genres, etc. The system 800 can use the chat filters to aggregate players into communal groups for player wagering games and/or for social communication possibilities during those games. For example, the system 800 may group only Portuguese players into a single communal wagering game based on a language preference setting on a language preference control 814. In other embodiments, for example, the system 800 may group together players for a communal wagering game of all language preferences according to a demographic preference setting on a demographic preference control 816, but at the same time, may create chat subgroups within the communal wagering game based on the language preference. In some embodiments, the system 800 can limit the ability of social network users to communicate with other users if the specific topic of the conversation falls outside a specified topical genre, or subject matter setting, indicated by a genre preference control 818. There are many possible embodiments for preferences and settings that the system 800 can use to filter chats, aggregation, etc. (e.g., age, religion, gender, profession, sexual preference, etc.). The wagering game console 804 also includes a trading console 830 that social network users can use to trade items including wagering-game-related items. The trading console 830 will be referred to later in connection with FIG. 7 below.

The flow 600 continues at processing block 606, where the system determines a request by the first social network user account, via the one or more online social communication controls, to communicate with a second social network user account. In some embodiments, the first and second social network user accounts can belong to the same social network. The system can integrate with social connection applications that belong to the social network to connect the first and second social network user accounts. In some embodiments, however, the system can determine that the first social network user account selects a second social network user account that is connected to a second, different social network. In some embodiments, the system can filter a chat session based on settings for the first social network user account, as described above. The system reads a setting that filters a chat audience to a specific group of social network users within the online social communication session. The setting can specify a common characteristic (e.g., a common social characteristic, or characteristic that indicates a commonality possessed by, belonging to, or desired by, a specific social group). The system can use the setting to presents a chat audience of social network users that share the common characteristic (e.g. as found in settings for the other users, found in metadata or tags, based on jurisdiction, based on game play history, based on language, based on content that users are accessing, etc.).

The flow 600 continues at processing block 608, where the system connects the second social network user account to the online social communication session and presents the social communication data to the second social network user account. In some embodiments, the system can present one or more second online social communication controls to the second social network user account via a second user interface on a second, or additional, social network website. The second social network user account receives the social communication data from the first social network user account and presents the social communication data via the second user interface. The first social network user account and the second social network user account can communicate socially, back-and-forth, which connected to the online social communication session. In some embodiments, the online social communication session can end when the communal wagering game session ends or when connection to a wagering game provider is disconnected. In some embodiments, however, the online social communication session can persist as a function of the social network provider's functionality.

The flow continues at processing block 610 where the system presents jurisdictional wagering options for a wager included in the social communication data. For example, referring back to FIG. 5, the system 500 can present the side-bet challenge 523. The system 500 can determine, from the jurisdictional rules 551, restrictions on player-to-player betting and present wagering options that are appropriate for cross jurisdictional player-to-player betting. For instance, the social game application 504 presents the message 524 as well as bet options 525. The bet options 525 relate to jurisdictional permissions and restrictions. For example, the bet options 525 can include an option to accept the side-bet challenge 523 and transact it directly through the social network applications, should the jurisdictional rules permit direct player-to-player gambling. In another embodiment, the options 525 can include a directional link, or other such mechanism, that would direct the players to another method, or venue, for making a wager. For instance, the system 500 can present a link to a personal brokerage system (e.g., PayPal) or another forum that would permit person-to-person wagering agreements or that would direct the players to mechanisms belonging to nearby jurisdictions that would allow the person-to-person betting. In some embodiments, the system 500 could determine that person-to-person betting may be restricted in one or both jurisdictions for the players and may provide an option to alter the side-bet challenge 523 to comport with jurisdictional rules (e.g., change the bet to points, or some other form of non-cash wagering).

Figure 7:
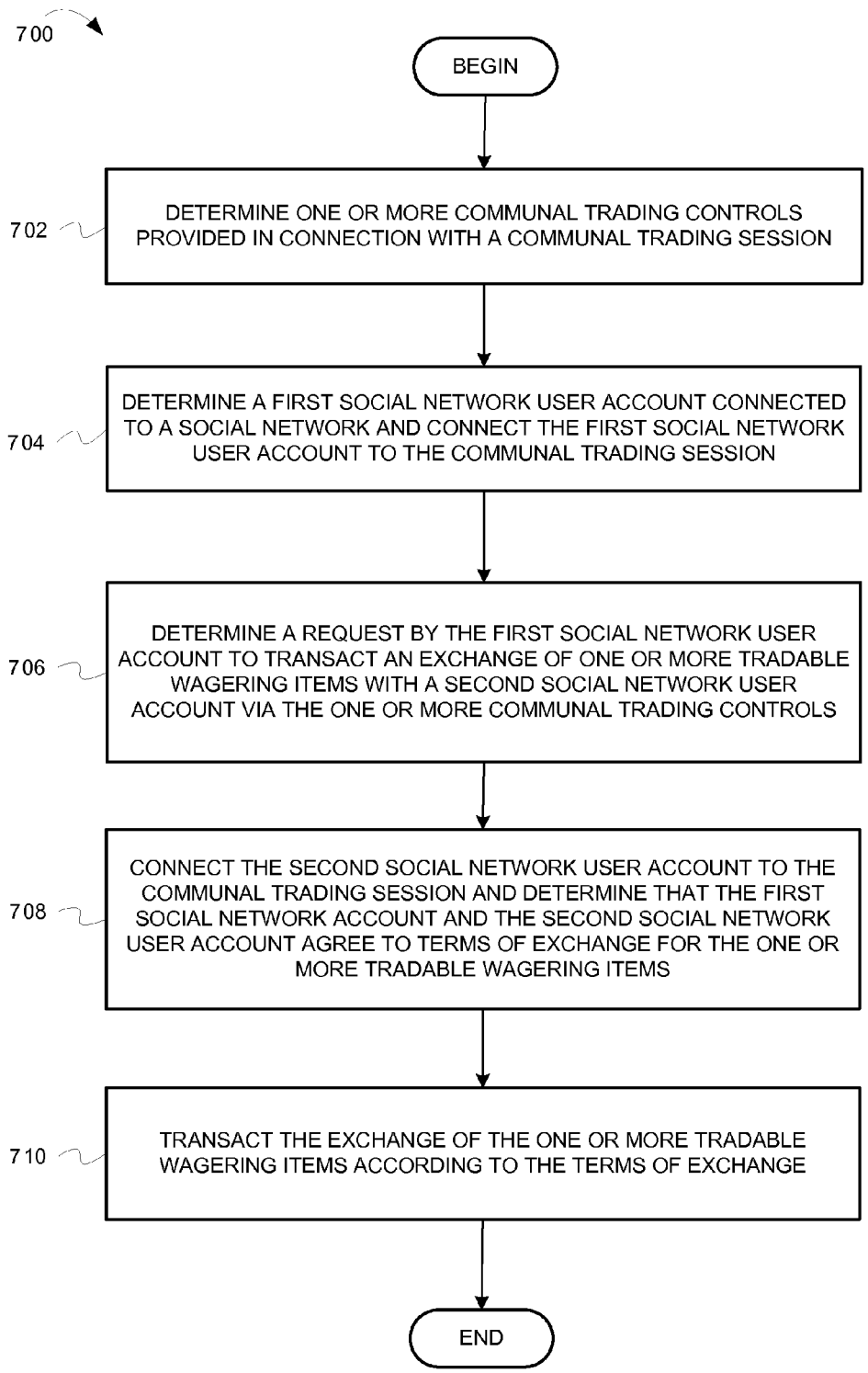
FIG. 7 is a flow diagram 700 illustrating controlling social trading of wagering game items, according to some embodiments.

FIG. 7 is a flow diagram ("flow") 700 illustrating controlling social trading of wagering game items, according to some embodiments. In FIG. 7, the flow 700 begins at processing block 702, where a wagering game system ("system") determines one or more communal trading controls provided in connection with a communal trading session. The system can determine that a communal trading session is created, active, or available for use. The system can create the communal trading session when prompted, such as by a selection or activation of one of the communal trading controls, or some other request mechanism. A wagering game server can control the communal trading session. In some embodiments, the communal trading session is associated with a communal wagering game session.

The flow 700 continues at processing block 704, where the system determines a first social network user account connected to a social network and connects the first social network user account to the communal trading session. In some embodiments, the system can present the communal trading controls to the first social network user account via a first user interface on a social network website. The first social network user account can use the one or more communal trading controls to indicate a desire to trade items.

The flow 700 continues at processing block 706, where the system determines a request by the first social network user account to transact an exchange of one or more tradable wagering items with a second social network user account via the one or more communal trading controls. In some embodiments, the tradable items are wagering game items that are stored in connection with a wagering game player account. The wagering game items can be items that a player account earned, won, received, etc. via wagering in, and playing, wagering games. The wagering game items can include virtual assets (e.g., trophies), bonus content, betting credits, rights to play wagering games, wagering game status points, leader board status, shared points, etc. In some embodiments, the tradable items may be non-wagering game items, such as social network points, social network items, social network privileges, personal items, files, services, virtual real estate, virtual money, etc. The first social network user account can use the one or more communal trading controls to select tradable items and to indicate trade partners and trade terms. For example, in FIG. 8, the trading console 830 includes an items list 832, a trade partner control 834, and a trade chat console 836 with a send control 838.

The flow 700 continues at processing block 708, where the system connects the second social network user account to the communal trading session and determines that the first social network account and the second social network user account agree to terms of exchange for the one or more tradable wagering items. In some embodiments, the system can determine terms of the exchange via a trading console, such as the trade chat console 836 in FIG. 8. However, in other embodiments, the system can determine an agreement of trade terms via email, third party action (e.g., bank transactions, personal escrow and trading accounts, commercial auction websites, etc.).

The flow 700 continues at processing block 710, where the system transacts the exchange of the one or more tradable wagering items according to the terms of exchange. In some embodiments, the system can transfer items from one account to another (e.g., from social network account to social network account). If the tradable items are wagering game items, the system can transfer stored items from, and/or between wagering game player accounts associated with the social network accounts or from social network accounts to wagering game player accounts, and vice versa. In some embodiments, the system can transact money payments from one account to another. In some embodiments, the system can transfer rights to participate in gaming activity from one account to another. In some embodiments, the system can transact virtual currency. In some embodiments, the system can provide controls for social network user accounts and/or player accounts to buy items in a virtual world or to perform virtual activities (e.g., play a shared game). The virtual items can increase player's abilities to perform better in communal wagering games. The system can also provide virtual currency to player accounts to use which they can later use via a communal trading session. For example, in FIG. 1, the social network player account Joaquin Cheveria from the Group Space website bets and receives awards for points instead of money. The jurisdiction for Joaquin Cheveria may prevent wagering gaming, but can still provide non-cash awards while the social network user plays games with other players that can play for cash. The system 100 can track money, and non-money, bets and awards and transact them accordingly while all players play in the same communal wagering game.

Additional Example Operating Environments

This section describes example operating environments, systems and networks, and presents structural aspects of some embodiments.

Wagering Game Computer System

Figure 9:
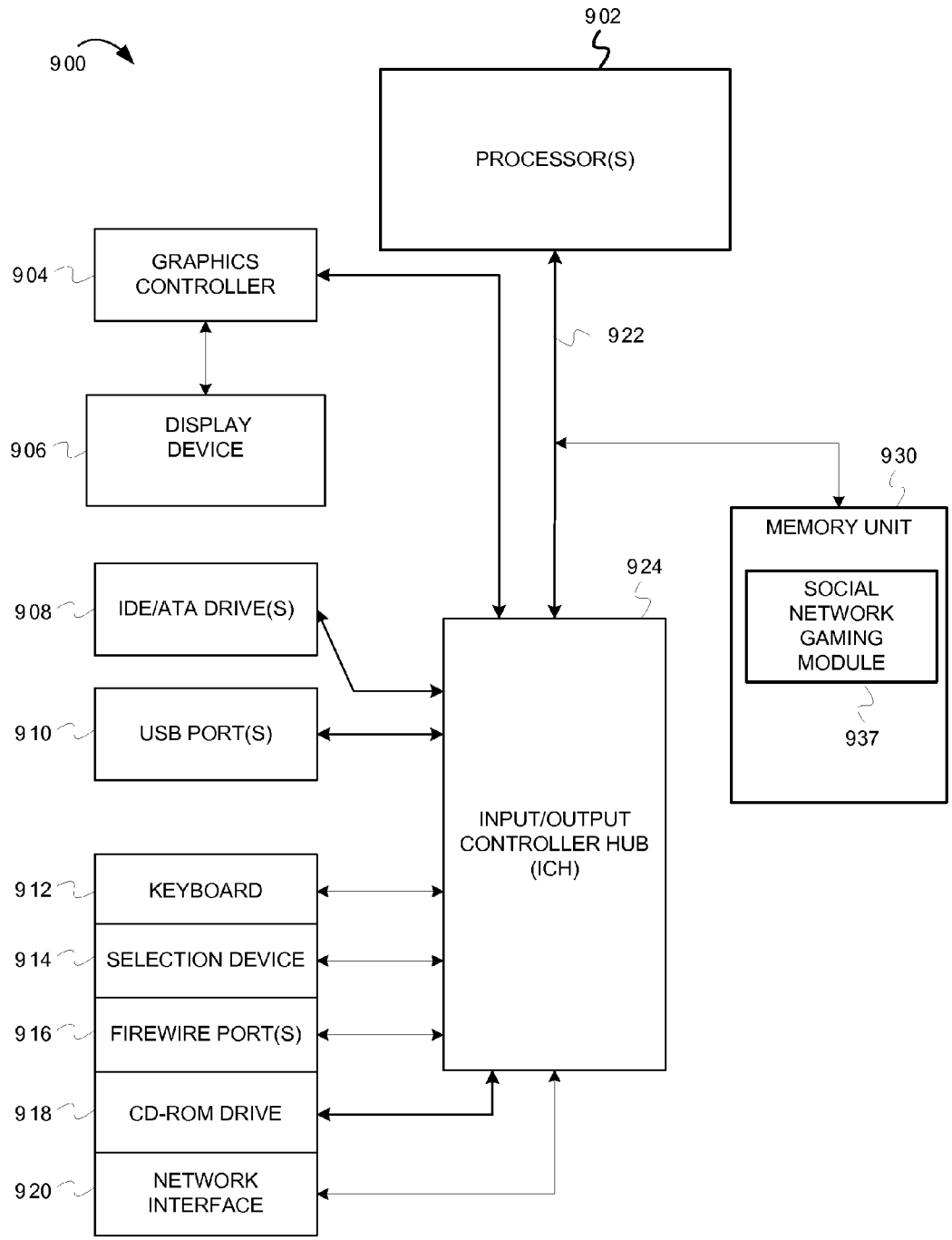
FIG. 9 is an illustration of a computer system 900, according to some embodiments.

FIG. 9 is a conceptual diagram that illustrates an example of a computer system 900, according to some embodiments. In FIG. 9, the computer system 900 may include a processor unit 902, a memory unit 930, a processor bus 922, and an Input/Output controller hub (ICH) 924. The processor unit 902, memory unit 930, and ICH 924 may be coupled to the processor bus 922. The processor unit 902 may comprise any suitable processor architecture. The computer system 900 may comprise one, two, three, or more processors, any of which may execute a set of instructions in accordance with some embodiments.

The memory unit 930 may also include an I/O scheduling policy unit 9 and I/O schedulers 9. The memory unit 930 can store data and/or instructions, and may comprise any suitable memory, such as a dynamic random access memory (DRAM), for example. The computer system 900 may also include one or more suitable integrated drive electronics (IDE) drive(s) 908 and/or other suitable storage devices. A graphics controller 904 controls the display of information on a display device 906, according to some embodiments.

The input/output controller hub (ICH) 924 provides an interface to I/O devices or peripheral components for the computer system 900. The ICH 924 may comprise any suitable interface controller to provide for any suitable communication link to the processor unit 902, memory unit 930 and/or to any suitable device or component in communication with the ICH 924. The ICH 924 can provide suitable arbitration and buffering for each interface.

For one embodiment, the ICH 924 provides an interface to the one or more IDE drives 908, such as a hard disk drive (HDD) or compact disc read only memory (CD ROM) drive, or to suitable universal serial bus (USB) devices through one or more USB ports 910. For one embodiment, the ICH 924 also provides an interface to a keyboard 912, selection device 914 (e.g., a mouse, trackball, touchpad, etc.), CD-ROM drive 918, and one or more suitable devices through one or more firewire ports 916. For one embodiment, the ICH 924 also provides a network interface 920 though which the computer system 900 can communicate with other computers and/or devices.

The computer system 900 may also include a machine-readable medium that stores a set of instructions (e.g., software) embodying any one, or all, of the methodologies for integrate social communities and wagering games. Furthermore, software can reside, completely or at least partially, within the memory unit 930 and/or within the processor unit 902. The computer system 900 can also include a social network gaming module 937. The social network gaming module 937 can process communications, commands, or other information, to integrate social communities and wagering games. Any component of the computer system 900 can be implemented as hardware, firmware, and/or machine-readable media including instructions for performing the operations described herein.

Wagering Game Machine Architecture

Figure 10:
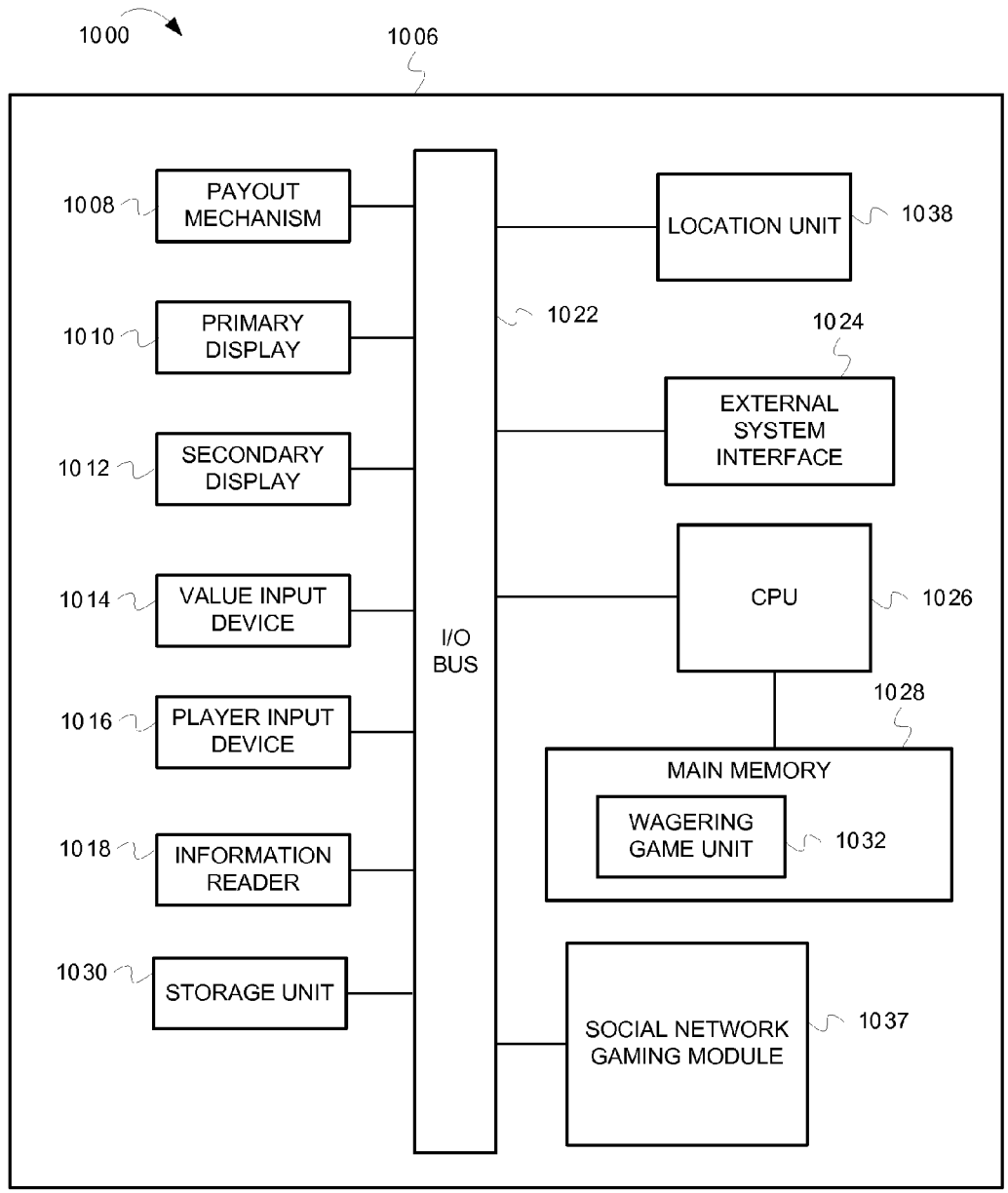
FIG. 10 is an illustration of a wagering game machine architecture 1000, according to some embodiments.

FIG. 10 is a conceptual diagram that illustrates an example of a wagering game machine architecture 1000, according to some embodiments. In FIG. 10, the wagering game machine architecture 1000 includes a wagering game machine 1006, which includes a central processing unit (CPU) 1026 connected to main memory 1028. The CPU 1026 can include any suitable processor, such as an Intel® Pentium processor, Intel® Core 2 Duo processor, AMD Opteron™ processor, or UltraSPARC processor. The main memory 1028 includes a wagering game unit 1032. In some embodiments, the wagering game unit 1032 can present wagering games, such as video poker, video black jack, video slots, video lottery, reel slots, etc., in whole or part.

The CPU 1026 is also connected to an input/output ("I/O") bus 1022, which can include any suitable bus technologies, such as an AGTL+ frontside bus and a PCI backside bus. The I/O bus 1022 is connected to a payout mechanism 1008, primary display 1010, secondary display 1012, value input device 1014, player input device 1016, information reader 1018, and storage unit 1030. The player input device 1016 can include the value input device 1014 to the extent the player input device 1016 is used to place wagers. The I/O bus 1022 is also connected to an external system interface 1024, which is connected to external systems (e.g., wagering game networks). The external system interface 1024 can include logic for exchanging information over wired and wireless networks (e.g., 802.11g transceiver, Bluetooth transceiver, Ethernet transceiver, etc.)

The I/O bus 1022 is also connected to a location unit 1038. The location unit 1038 can create player information that indicates the wagering game machine's location/movements in a casino. In some embodiments, the location unit 1038 includes a global positioning system (GPS) receiver that can determine the wagering game machine's location using GPS satellites. In other embodiments, the location unit 1038 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 10, in some embodiments, the location unit 1038 is not connected to the I/O bus 1022.

In some embodiments, the wagering game machine 1006 can include additional peripheral devices and/or more than one of each component shown in FIG. 10. For example, in some embodiments, the wagering game machine 1006 can include multiple external system interfaces 1024 and/or multiple CPUs 1026. In some embodiments, any of the components can be integrated or subdivided.

In some embodiments, the wagering game machine 1006 includes a social network gaming module 1037. The social network gaming module 1037 can process communications, commands, or other information, where the processing can integrate social communities and wagering games.

Furthermore, any component of the wagering game machine 1006 can include hardware, firmware, and/or machine-readable media including instructions for performing the operations described herein.

Mobile Wagering Game Machine

Figure 11:
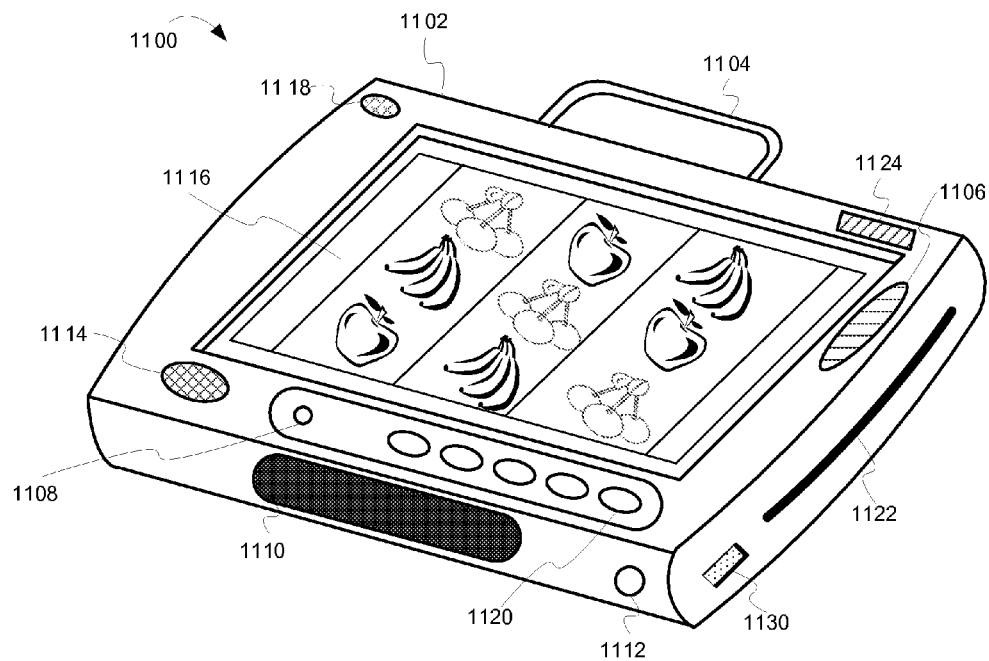
FIG. 11 is an illustration of a mobile wagering game machine 1100, according to some embodiments.

FIG. 11 is a conceptual diagram that illustrates an example of a mobile wagering game machine 1100, according to some embodiments. In FIG. 11, the mobile wagering game machine 1100 includes a housing 1102 for containing internal hardware and/or software such as that described above vis-à-avis FIG. 10. In some embodiments, the housing has a form factor similar to a tablet PC, while other embodiments have different form factors. For example, the mobile wagering game machine 1100 can exhibit smaller form factors, similar to those associated with personal digital assistants. In some embodiments, a handle 1104 is attached to the housing 1102. Additionally, the housing can store a foldout stand 1110, which can hold the mobile wagering game machine 1100 upright or semi-upright on a table or other flat surface.

The mobile wagering game machine 1100 includes several input/output devices. In particular, the mobile wagering game machine 1100 includes buttons 1120, audio jack 1108, speaker 1114, display 1116, biometric device 1106, wireless transmission devices (e.g., wireless communication units 1112 and 1124), microphone 1118, and card reader 1122. Additionally, the mobile wagering game machine can include tilt, orientation, ambient light, or other environmental sensors.

In some embodiments, the mobile wagering game machine 1100 uses the biometric device 1106 for authenticating players, whereas it uses the display 1116 and the speaker 1114 for presenting wagering game results and other information (e.g., credits, progressive jackpots, etc.). The mobile wagering game machine 1100 can also present audio through the audio jack 1108 or through a wireless link such as Bluetooth.

In some embodiments, the wireless communication unit 1112 can include infrared wireless communications technology for receiving wagering game content while docked in a wager gaming station. The wireless communication unit 1124 can include an 802.11G transceiver for connecting to and exchanging information with wireless access points. The wireless communication unit 1124 can include a Bluetooth transceiver for exchanging information with other Bluetooth enabled devices.

In some embodiments, the mobile wagering game machine 1100 is constructed from damage resistant materials, such as polymer plastics. Portions of the mobile wagering game machine 1100 can be constructed from non-porous plastics, which exhibit antimicrobial qualities. Also, the mobile wagering game machine 1100 can be liquid resistant for easy cleaning and sanitization.

In some embodiments, the mobile wagering game machine 1100 can also include an input/output ("I/O") port 1130 for connecting directly to another device, such as to a peripheral device, a secondary mobile machine, etc. Furthermore, any component of the mobile wagering game machine 1100 can include hardware, firmware, and/or machine-readable media including instructions for performing the operations described herein.

The described embodiments may be provided as a computer program product, or software, that may include a machine-readable medium having stored thereon instructions, which may be used to program a computer system (or other electronic device(s)) to perform a process according to embodiments(s), whether presently described or not, because every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A method comprising:
   determining to add players to an online communal wagering game associated with a wagering game provider;
   determining that social network user accounts are available to play in the online communal wagering game as the players, wherein the social network user accounts are associated with one or more social network providers;
   providing game data to the one or more social network providers, wherein the game data is associated with the online communal wagering game;
   receiving account connection data for the social network user accounts;
   connecting the social network user accounts to a wagering game session for the online communal wagering game using the account connection data;
   determining geographic locations associated with the social network user accounts;
   determining jurisdictional rules for conducting wagering games for the geographic locations;
   controlling wagering functions associated with a first of the social network user accounts connected to the online communal wagering game via the wagering game session based on a first of the jurisdictional rules; and
   controlling non-monetary wagering functions associated with a second of the social network user accounts connected to the online communal wagering game based on a second of the jurisdictional rules associated with a second of the geographic locations associated with the second of the social network user accounts.

2. The method of claim 1, wherein the determining to add the players to the online communal wagering game comprises:
   determining that a number of player accounts connected to the online communal wagering game is less than a minimum number of players for the online communal wagering game; and
   searching the one or more social network providers to find the social network user accounts in response to determining that the number of player accounts connected to the online communal wagering game is less than the minimum number of players.

3. The method of claim 1, wherein the account connection data includes information to connect the social network user accounts to associated wagering game player accounts.

4. The method of claim 1 further comprising:
   receiving social network communication data from the first of the social network user accounts directed to the second of the social network user accounts connected to the online communal wagering game; and
   providing the social network communication data for presentation via a wagering game interface on a social network website.

5. The method of claim 1, wherein the controlling the wagering functions associated with the first of the social network user accounts further comprises determining that the first of the jurisdictional rules permits cash wagering during the wagering game session by the first of the social network user accounts; and wherein controlling the non-monetary wagering functions associated with the second of the social network user accounts comprises:
   determining that the second of the jurisdictional rules, for the second of the geographic locations, prohibits cash wagering by the second of the social network user accounts during the wagering game session; and
   providing non-cash wagering for the second of the social network user accounts during the wagering game session.

6. The method of claim 1 further comprising:
   providing affiliate compensation to at least one of the one or more social network providers for providing at least one of the social network user accounts.

7. One or more non-transitory machine-readable media having instructions stored thereon, which when executed by a set of one or more processors causes the set of one or more processors to perform operations comprising:
   connecting a first social network user account and a second social network user account to a gaming session for a communal wagering game;
   determining a request associated with the first social network user account to place a side-wager against the second social network user account for the communal wagering game;
   detecting a jurisdictional rule associated with a geographic location associated with the second social network user account;
   determining that the jurisdictional rule prohibits a characteristic of the side-wager for the second social network user account; and
   altering the characteristic of the side-wager to comport with the jurisdictional rule.

8. The one or more non-transitory machine readable media of claim 7, wherein the operation of altering the characteristic of the side-wager to comport with the jurisdictional rule includes operations further comprising changing a cash value of the side-wager to a non-cash value.

9. The one or more non-transitory machine-readable media of claim 7 said operations further comprising:
   providing one or more options during the gaming session for altering the characteristic of the side-wager to comport with the jurisdictional rule;
   detecting a selection of the one or more options via user input associated with the second social network user account; and
   altering the characteristic of the side-wager to comport with the jurisdictional rule in response to the selection of the one or more options via the user input.

10. The one or more non-transitory machine-readable media of claim 9 said operations further comprising:
    determining a request associated with the first social network user account to communicate with the second social network user account via one or more online social communication controls provided in connection with the gaming session;
    receiving social network communication data from the first social network user account directed to the second social network user account; and providing the social network communication data to the second social network user account.

11. The one or more non-transitory machine-readable media of claim 10 said operations further comprising:
determining one or more preference settings for the first social network user account regarding one or more characteristics of players within the communal wagering game, wherein the one or more characteristics of players include a commonality of a social group; and
connecting the first social network user account to a group of players of the communal wagering game that correspond to the one or more characteristics of players.

12. The one or more non-transitory machine-readable media of claim 11, said operations further comprising filtering a chat session based on the one or more preference settings.

13. The one or more non-transitory machine-readable media of claim 7, wherein the first social network user account and the second social network user account are hosted by different social network providers.

14. A system comprising:
at least one processor; and
at least one memory unit configured to store instructions which, when executed by the one or more processors, cause the system to
determine that social network user accounts hosted by one or more social network servers are available to play in an online communal wagering game hosted by a wagering game server,
receive connection data from the one or more social network servers, wherein the connection data is associated with the social network user accounts,
connect the social network user accounts to a wagering game session via use of the connection data,
provide communal wagering game content to the one or more social network servers after the social network user accounts are connected,
transact the online communal wagering game according to user input associated with the social network user accounts,
determine, based on the connection data, a first geographic locations associated with a first of the social network user accounts and a second geographic location associated with a second of the social network user accounts,
detect that first jurisdictional rules associated with the first geographic location are different from second jurisdictional rules associated with the second geographic location,
control, within the online communal wagering game, monetary wagering functions for the first of the social network user accounts based on the first jurisdictional rules, and
control non-monetary wagering functions for the second of the social network user accounts based on the second jurisdictional rules.

15. The system of claim 14 further comprising:
one or more clients configured to
present the online communal wagering game content,
receive the user input associated with communal wagering game playing activity for the one or more social network user accounts via the online communal wagering game, and
provide the user input to the wagering game server to transact the online communal wagering game.

16. The system of claim 14, wherein the instructions, when executed by the at least one processor, further cause the system to
license the communal wagering game content to the one or more social network servers, and
provide affiliate compensation to the one or more social network servers for betting losses incurred by at least the first of the social network user accounts during the online communal wagering game.

17. The system of claim 14, wherein the instructions, when executed by the at least one processor, further cause the system to
control transactions for non-monetary items between the social network accounts, wherein the non-monetary items are usable to improve performance in the communal wagering game.

18. An apparatus comprising:
a processor; and
a social network gaming module configured to, via the processor,
connect a first social network user account to a gaming session for an online communal wagering game based on first account connection data that connects the first social network user account to a social network provider, wherein the online communal wagering game is hosted by a wagering game provider,
connect a second social network user account to the gaming session for the online communal wagering game based on second account connection data,
determine a request via the first social network user account to transact an exchange of one or more non-cash items with the second social network user account, wherein the one or more non-cash items are usable in the online communal wagering game,
determine an agreement associated with the first social network account and the second social network user account regarding terms of an exchange of the one or more non-cash items, and
transact the exchange of the one or more non-cash items for the first social network user account and the second social network user account according to the terms of the exchange.

19. The apparatus of claim 18, wherein the social network gaming module is further configured to
receive first user input data that indicates the request via the first social network user account to transact the exchange of the one or more non-cash items, wherein the first user input data originates from the social network provider, and
receive second user input data, via the second social network user account, in response to the request via the first social network user account, wherein the second user input data confirms the terms of the exchange, and wherein the second user input data originates from an additional social network provider separate from the social network provider.

20. The apparatus of claim 18, wherein the one or more non-cash items are usable to improve performance in the online communal wagering game, and wherein the one or more non-cash items include one or more of wagering game items, virtual game assets, wagering game trophies, bonus game content, betting credits, rights to play wagering games, wagering game status points, leader board status for the communal wagering game, and shared game points.

21. The apparatus of claim 18, wherein the one or more non-cash items are earned during wagering game play via a first wagering game player account associated with the first social network user account, wherein the one or more non-cash items are stored in connection with the first wagering game player account, and wherein the social network gaming module is further configured to transfer the one or more non-cash items from the first wagering game player account to a second wagering game player account associated with the second social network user account.

22. An apparatus comprising:

means for connecting a first social network user account and a second social network user account to a gaming session for a communal wagering game;

means for determining that a first jurisdictional rule, for a first geographic location associated with the first social network user account, permits monetary wagering in the communal wagering game;

means for determining that a second jurisdictional rule, for a second geographic location associated with the second social network user account, prohibits monetary wagering in the communal wagering game; and means for providing a non-monetary wagering alternative for the second social network user account to wager in the communal wagering game, which non-monetary wagering alternative comports with the second jurisdictional rule.

23. The apparatus of claim 22, wherein the means for providing the non-monetary wagering alternative comprises providing wagering of one or more of entertainment points, customer appreciation points, play money, virtual currency, non-cash items, social network points, social network items, social network privileges, personal items, files, services, and virtual real-estate.

24. The apparatus of claim 22 further comprising:

means for requiring a monetary buy-in to the communal wagering game by the first social network user account; and means for requiring a non-monetary buy-in to the communal wagering game by the second social network user account.

25. The apparatus of claim 22 further comprising:

means for receiving a non-monetary wager from the second social network user account;

means for detecting a winning result associated with the second social network user account in the communal wagering game; and means for paying the second social network user account a non-monetary payout.

* * * * *